United States Patent
Craven-Bartle et al.

(10) Patent No.: US 10,365,768 B2
(45) Date of Patent: Jul. 30, 2019

(54) TIR-BASED OPTICAL TOUCH SYSTEMS OF PROJECTION-TYPE

(71) Applicant: FlatFrog Laboratories AB, Lund (SE)

(72) Inventors: Thomas Craven-Bartle, Sodra Sandby (SE); Håkan Bergström, Torna-Hallestad (SE); Ivan Karlsson, Lund (SE); Ola Wassvik, Brosarp (SE); David Sernelius, Malmo (SE)

(73) Assignee: FlatFrog Laboratories AB, Lund (SE)

( * ) Notice: Subject to any disclaimer, the term of this patent is extended or adjusted under 35 U.S.C. 154(b) by 541 days.

(21) Appl. No.: 14/653,113

(22) PCT Filed: Dec. 17, 2013

(86) PCT No.: PCT/SE2013/051537
§ 371 (c)(1),
(2) Date: Jun. 17, 2015

(87) PCT Pub. No.: WO2014/098744
PCT Pub. Date: Jun. 26, 2014

(65) Prior Publication Data
US 2015/0331546 A1  Nov. 19, 2015

Related U.S. Application Data

(60) Provisional application No. 61/740,093, filed on Dec. 20, 2012.

(30) Foreign Application Priority Data
Dec. 20, 2012 (SE) ........................ 1251474

(51) Int. Cl.
*F21V 8/00* (2006.01)
*G06F 3/041* (2006.01)
(Continued)

(52) U.S. Cl.
CPC ............ *G06F 3/0421* (2013.01); *G02B 5/00* (2013.01); *G02B 5/005* (2013.01); *G02B 6/0038* (2013.01);
(Continued)

(58) Field of Classification Search
CPC ................. G06F 3/0421; G06F 3/0416; G06F 2203/04109; G06F 2203/04103;
(Continued)

(56) References Cited

U.S. PATENT DOCUMENTS

| 3,673,327 A | 6/1972 | Johnson et al. |
| 4,254,333 A | 3/1981 | Bergstrom |

(Continued)

FOREIGN PATENT DOCUMENTS

| GB | 2472444 A | 2/2011 |
| WO | WO-2007/003196 A2 | 1/2007 |

(Continued)

OTHER PUBLICATIONS

International Search Report and Written Opinion dated Apr. 25, 2014 issued in corresponding International Application No. PCT/SE2013/051537.

(Continued)

*Primary Examiner* — Patrick N Edouard
*Assistant Examiner* — Joseph P Fox
(74) *Attorney, Agent, or Firm* — Knobbe Martens Olson & Bear, LLP

(57) ABSTRACT

A touch-sensitive apparatus operates by light frustration (FTIR) and comprises a light transmissive panel (1) that defines a front surface (5) and a rear surface (6), light emitters optically connected to the panel (1) so as to generate light that propagates by total internal reflection inside the panel, and light detectors (3) optically connected to the panel (1) so as to define a grid of propagation paths inside the (Continued)

panel (1) between pairs of light emitters and light detectors (3). Each light detector (3) is optically connected to the panel (1) via an angular filter (20). The filter (20) is applied to an outcoupling region on at least one of the front and rear surfaces (5, 6) and is configured to transmit light only within a confined range of angles with respect to the normal of the outcoupling region. The confined range extends from a lower angle limit $\theta_{min}$ to an upper angle limit $\theta_{max}$. The lower angle limit $\theta_{min}$ is equal to or larger than a critical angle $\theta_C$, which is given by $\theta_C = \arcsin(1/n_{panel})$, with $n_{panel}$ being the refractive index of the light transmissive panel (1) at the outcoupling region.

15 Claims, 8 Drawing Sheets

(51) Int. Cl.
  *G02B 5/00* (2006.01)
  *G06F 3/042* (2006.01)
(52) U.S. Cl.
  CPC ......... *G02B 6/0053* (2013.01); *G06F 3/0416* (2013.01); *G06F 2203/04103* (2013.01); *G06F 2203/04109* (2013.01)
(58) Field of Classification Search
  CPC .... G02B 6/0038; G02B 6/0053; G02B 5/005; G02B 5/00
  See application file for complete search history.

(56) References Cited

U.S. PATENT DOCUMENTS

| | | | |
|---|---|---|---|
| 6,972,753 | B1 | 12/2005 | Kimura et al. |
| 7,432,893 | B2 | 10/2008 | Ma et al. |
| 7,995,039 | B2 | 8/2011 | Eliasson et al. |
| 2006/0114237 | A1 | 6/2006 | Crockett et al. |
| 2007/0075648 | A1 | 4/2007 | Blythe et al. |
| 2009/0122020 | A1* | 5/2009 | Eliasson ............... G06F 3/0421 345/173 |
| 2009/0153519 | A1* | 6/2009 | Suarez Rovere ..... G06F 3/0421 345/173 |
| 2009/0267919 | A1* | 10/2009 | Chao ..................... G06F 3/0421 345/175 |
| 2011/0074734 | A1* | 3/2011 | Wassvik ................ G06F 3/0423 345/175 |
| 2011/0205750 | A1* | 8/2011 | Krijn ..................... G02B 6/0018 362/551 |
| 2012/0044572 | A1* | 2/2012 | Simmonds ........... G02B 6/0038 359/630 |
| 2014/0035836 | A1* | 2/2014 | Cui ........................ G06F 3/0421 345/173 |

FOREIGN PATENT DOCUMENTS

| | | |
|---|---|---|
| WO | WO-2009/048365 A1 | 4/2009 |
| WO | WO-2009/077962 A2 | 6/2009 |
| WO | WO-2010/006882 A2 | 1/2010 |
| WO | WO-2010/006884 A2 | 1/2010 |
| WO | WO-2010/015408 A1 | 2/2010 |
| WO | WO-2010/064983 A2 | 6/2010 |
| WO | WO-20101134865 A1 | 11/2010 |
| WO | WO-2011/028169 A1 | 3/2011 |
| WO | WO-2011/049511 A1 | 4/2011 |
| WO | WO-2011/049512 A1 | 4/2011 |
| WO | WO-2011/139213 A1 | 11/2011 |
| WO | WO-2012/050510 A1 | 4/2012 |
| WO | WO-2012/105893 A1 | 8/2012 |
| WO | WO-2012/121652 A1 | 9/2012 |
| WO | WO-2013/062471 A2 | 5/2013 |
| WO | WO-2013/133757 A2 | 9/2013 |
| WO | WO-2013/165305 A2 | 11/2013 |
| WO | WO-2013/165306 A2 | 11/2013 |

OTHER PUBLICATIONS

Anderson, R. Rox, B.S., and John A. Parrish, M.D. "The Optics of Human Skin." *Journal of Investigative Dermatology* 77.1 (1981): 13-19.

Cornelissen, Hugo J. et al. "Injecting Light of High-Power LEDs into Thin Light Guides." *Proc. SPIE* 7652. International Optical Design Conference (2010): 7652121-7652126.

Mu, Cong et al. "Dielectric multilayer angular filters for coupling LEDs to thin light guides." *Proc SPIE* 8170 (2011): 817001-1-817001-10.

Scheuplein, Robert J., Ph.D. "A Survey of Some Fundamental Aspects of the Absorption and Reflection of Light by Tissue." *J. Soc. Cos. Chem.* 15 (1964): 111-122.

Thomas, G.L. and T.E. Reynoldson. "Some observations on fingerprint deposits." *J. Phys. D: Appl. Phys.* 8 (1975): 724-729.

* cited by examiner

TIR-BASED OPTICAL TOUCH SYSTEMS OF PROJECTION-TYPE

CROSS-REFERENCE TO RELATED APPLICATIONS

This application is a national phase under 35 U.S.C. § 371 of PCT International Application No. PCT/SE2013/051537 which has an International filing date of Dec. 20, 2013, which claims priority to Sweden patent application number SE 1251474-1 filed Dec. 20, 2012 and U.S. provisional patent application No. 61/740,093 filed Dec. 20, 2012.

TECHNICAL FIELD

The present invention generally relates to optical touch-sensing systems, and in particular to such systems that operate by projection measurements of light that propagates by total internal reflection (TIR) inside a light transmissive panel.

BACKGROUND ART

Touch-sensing systems ("touch systems") are in widespread use in a variety of applications. Typically, the touch systems are actuated by a touching object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

There are numerous known techniques for providing touch sensitivity, e.g. by incorporating resistive wire grids, capacitive sensors, strain gauges, etc into a touch panel. There are also various types of optical touch systems, which e.g. detect shadows cast by touching objects onto a touch surface, or detect light scattered off the point(s) of touching objects on a touch panel.

One specific type of optical touch system uses projection measurements of light that propagates on a plurality of propagation paths inside a light transmissive panel that defines a touch surface. The projection measurements thus quantify a property, e.g. power, of the light on the individual propagation paths, when the light has passed the panel. The light propagates inside the panel by total internal reflection (TIR) against the touch surface, such that objects on the touch surface causes the propagating light on one or more propagation paths to be attenuated, commonly denoted FTIR (Frustrated Total Internal Reflection). For touch determination, the projection measurements may be processed by simple triangulation, or by more advanced image reconstruction techniques that generate a two-dimensional distribution of disturbances on the touch surface, i.e. an "image" of everything on the touch surface that affects the measured property. Examples of such touch systems are found in U.S. Pat. Nos. 3,673,327, 4,254,333, 6,972,753, 7,432,893, US2006/0114237, US2007/0075648, WO2009/048365, US2009/0153519, WO2010/006882, WO2010/064983, WO2010/134865 and WO2012/105893.

The prior art suggests several different approaches for introducing the light into the panel and for detecting the light downstream of the touch surface. For example, U.S. Pat. No. 7,432,893 proposes coupling light into the panel via revolved prisms that are attached to the rear surface of the panel, and detecting the light at photodetectors that are directly attached to the front surface of panel. In WO2010/064983, light is coupled into and out of the panel via the edge surface that connects the front and rear surfaces of the panel, or via wedges that are attached to the front or rear surface of the panel. In WO2012/105893, a sheet-like microstructured element, e.g. a tape of light transmissive material, is provided on the front or rear surface of the panel for coupling light into and out of the panel.

One challenge when designing an optical touch system of this type is to enable consistent touch determination despite the fact that the detectors need to detect small changes in weak optical signals in presence of potentially significant interferences that affect the reliability of the optical signals. One such interference is caused by ambient light, e.g. from sunlight or residential lighting, that may impinge on the detectors and influence the optical signals. Another interference is caused by accumulation of contamination on the touch surface, such a fingerprints, drops of saliva, sweat, smear, liquid spills, etc. The contamination will interact with the propagating light and cause changes to the optical signals that may be difficult to distinguish from changes caused by "true objects", e.g. objects that are actively manipulated in contact with the touch surface.

In touch-sensitive devices, there is also a general trend to avoid attaching components to the front surface. These components may form a frame around the touch-sensitive region and thereby reduce the ratio of the active area (the surface area that is available for touch interaction) to the total surface area of the touch-sensitive device. Furthermore, if the components protrude from the front surface of the panel, it may be necessary to provide a bezel at the perimeter of the panel to protect and hide the components and possibly any wiring connected to the components. Given the nature of user interaction with touch-sensitive devices, such a bezel may disrupt the user experience and even prevent certain types of interaction. The bezel may also cause dirt and other contaminants to accumulate in the area where the bezel joins the panel. To overcome this problem, it is desirable to design touch systems for flush mount of the panel in the supporting frame of the touch-sensitive device, i.e. such that the front surface of the panel is essentially level with the surrounding frame material. This is also known as "edge-to-edge".

In aforesaid U.S. Pat. No. 7,432,893, the impact of ambient light is reduced by attaching the photodetectors to the front surface, such that the photodetectors face away from the ambient light that enters the panel through the front surface. This solution requires a significant bezel to hide and protect the photodetectors and the associated wiring. U.S. Pat. No. 7,432,893 also proposes to intermittently measure ambient levels at the photodetectors and compensate the respective projection measurement for the measured ambient level.

The influence of contamination may be handled by dedicated signal processing that actively estimates the influence of contamination over time and compensates for this influence, e.g. as disclosed in WO2011/028169, WO2011/049512 and WO2012/121652.

However, in view of the weak optical signals and small attenuation caused by touching objects, there is room for further improvement when it comes to increasing the robustness of the touch system to ambient light and contamination on the touch surface.

In the field of LCD display technology, which is outside the field of touch-sensitive systems, it is known to couple light from LEDs into thin light guide panels as part of so-called backlights (BLUs, Backlight units) for LCD displays. The light guide panel is located behind the LCD and is configured to emit light from its top surface to uniformly illuminate the rear side of the LCD. One approach for coupling the LEDs to the light guide panel is proposed in the article "Injecting Light of High-Power LEDs into Thin Light Guides", by Cornelissen et al, published in Proc. SPIE 7652, International Optical Design Conference 2010, pp 7652121-7652126, 2010. According to this approach, the top surface of the LED is modified to have a rough surface behaving like a Lambertian reflector. A dielectric multilayer filter is deposited on the bottom of the light guide panel, and the top surface of the LED is optically coupled to the filter by a silicone adhesive. The filter is optimized to only transmit light emitted from the LED at angles larger than the critical angle at the light guide-air interface. The purpose of the multilayer is thus to only transmit light that can propagate in the light guide. The light emitted at smaller angles is reflected back toward the rough LED surface where it is subsequently recycled by reflection and redistribution. Further elaboration on this incoupling approach is given in the article "Dielectric multilayer angular filters for coupling LEDs to thin light guides", by Mu et al, published in Proc. SPIE 8170, pp 8170011-81700110, 2011.

SUMMARY

It is an objective of the invention to at least partly overcome one or more of the above-identified limitations of the prior art.

Another objective is to provide a touch-sensitive apparatus that has a reduced sensitivity to ambient light.

A further objective to provide a touch-sensitive apparatus that has a reduced sensitivity to contamination on the touch surface.

A still further objective is to provide a touch-sensitive apparatus that has a flat front surface, without bezel or other projecting structures.

Yet another objective is to provide a compact touch-sensitive apparatus.

Another objective is to provide a touch-sensitive apparatus suitable for mass-production.

One or more of these objectives, as well as further objectives that may appear from the description below, are at least partly achieved by touch-sensitive apparatuses according to the independent claims, embodiments thereof being defined by the dependent claims.

A first aspect of the invention is a touch-sensitive apparatus, comprising: a light transmissive panel that defines a front surface and an opposite, rear surface; a plurality of light emitters optically connected to the light transmissive panel so as to generate propagating light that propagates by total internal reflection inside the light transmissive panel across a touch-sensitive region on the light transmissive panel; a plurality of light detectors optically connected to the light transmissive panel so as to define a grid of propagation paths across the touch-sensitive region between pairs of light emitters and light detectors; wherein each light detector is optically connected to the light transmissive panel via an angular filter which is applied to an outcoupling region on at least one of the front and rear surfaces and is configured to transmit the propagating light only within a confined range of angles with respect to the normal of the outcoupling region; and wherein the confined range extends from a lower angle limit $\theta_{min}$ to an upper angle limit $\theta_{max}$, wherein the lower angle limit $\theta_{min}$ is equal to or larger than a critical angle $\theta_c$, which is given by $\theta_c=\arcsin(1/n_{panel})$, with $n_{panel}$ being the refractive index of the light transmissive panel at the outcoupling region.

In one embodiment, the lower angle limit $\theta_{min}$ exceeds the critical angle by an angle $\Delta\theta$, which is at least 5°, 10° or 15°.

In another embodiment, the lower angle limit $\theta_{min}$ is equal to or larger than a first cut-off angle $\theta_w=\arcsin(n_w/n_{panel})$, with $n_w$ being the refractive index of water, $n_{panel}>n_w$.

In one embodiment, the lower angle limit $\theta_{min}$ is equal to or larger than a second cut-off angle $\theta_f=\arcsin(n_f/n_{panel})$, with $n_f$ being the refractive index of finger fat, $n_{panel}>n_f$.

In one embodiment, the upper angle limit $\theta_{max}$ is equal to or smaller than a third cut-off angle $\theta_{cs}=\arcsin(1.55/n_{panel})$, $n_{panel}>1.55$.

In one embodiment, the light transmissive panel is mounted onto a front surface of a display device by a lamination layer of light transmissive material which is arranged in contact with the rear surface of the light transmissive panel and the front surface of the display device, wherein the lower angle limit $\theta_{min}$ is approximately equal to or larger than a laminate cut-off angle $\theta_{c,l}=\arcsin(n_{lam}/n_{panel})$, with $n_{lam}$ being the refractive index of lamination layer, $n_{lam}<n_{panel}$.

In an alternative embodiment, the touch-sensitive apparatus further comprises a layered light absorber comprising a coupling layer of light transmissive material on the rear surface of the light transmissive panel, and an absorbing layer of light-absorbing material on the coupling layer, said coupling layer having an index of refraction $n_{coupl}<n_{panel}$. The lower angle limit $\theta_{min}$ of the angular filter may be approximately equal to or larger than an absorber cut-off angle $\theta_{c,c}=\arcsin(n_{coupl}/n_{panel})$, and the layered light absorber may extend from the respective outcoupling port and may have a width which, along the detection lines that extend to the respective light detector, is at least equal to a distance between consecutive reflections in the rear surface for propagating light that impinges on the rear surface with an angle of incidence of $\theta_{c,c}$ to a normal of the rear surface. It may be preferable that the layered light absorber is arranged to overlap a major part, or essentially all, of the touch-sensitive region.

In one embodiment, the angular filter is configured to define essentially the same confined range of angles for all detection lines that extend to the respective light detector.

In one embodiment, the angular filter is configured as a dielectric multilayer structure. The touch-sensitive apparatus may further comprise a light recycler which is arranged beneath the angular filter to define a light reflective enclosure with respect to the angular filter and a light-sensitive surface of the respective light detector.

In one recycler embodiment, the light reflective enclosure is at least partly diffusively reflecting to angularly re-distribute the light that enters the light reflective enclosure via the angular filter.

In one recycler embodiment, the light reflective enclosure comprises a light reflective bottom surface that is spaced from and extends parallel to the angular filter and a reflective side wall structure that extends between the light reflective bottom surface and the angular filter. In one implementation, the side wall structure may be specularly reflective, and at least a portion of the bottom surface may be diffusively reflective.

In one recycler embodiment, the light reflective enclosure may be filled by a light transmissive material.

In an alternative recycler embodiment, the light reflective enclosure is hollow, and a disruptive structure is provided on the angular filter so as to face the light reflective enclosure, wherein the disruptive structure is configured to transmit and redirect at least part of the light transmitted by the angular filter into the light reflective enclosure. The disruptive structure may be one of a non-imaging, diffusively transmitting structure, and an imaging structure configured to refract the light transmitted by the angular filter.

In one recycler embodiment, the light detector is arranged with the light-sensitive surface facing the angular filter. In an alternative recycler embodiment, the light detector is arranged to project into the light enclosure such that the light-sensitive surface is facing the side wall structure.

In one recycler embodiment, the light reflective enclosure comprises a microstructure that defines a mirror with an optical power so as to re-direct the transmitted propagating light onto the light-sensing surface.

In one recycler embodiment, the light recycler is configured as a funnel which is configured to specularly reflect the transmitted propagating light from the angular filter towards the light-sensitive surface of the light detector.

In an embodiment without a light recycler, a body of light-transmissive material is attached to the angular filter, and the light detector is attached to the body such that a light-sensitive surface of the light detector directly receives the transmitted propagating light from the angular filter.

In one embodiment, the angular filter is arranged to transmit the propagating light to the respective light detector within a respective outcoupling port on the rear surface, wherein the extent of the respective outcoupling port, along the detection lines that extend to the respective light detector, is at least equal to a distance between consecutive reflections in the rear surface for the propagating light that impinges on the angular filter with an angle of incidence of $\theta_{min}$ to a normal of the angular filter.

In one embodiment, the touch-sensitive apparatus comprises a specularly reflective edge element which is arranged, adjacent to the outcoupling region, on an edge portion that connects the front surface and the rear surface of the light transmissive panel, so as to specularly reflect the propagating light that impinges on the specularly reflective edge element.

In one embodiment, the propagating light comprises light in an infrared wavelength region, and wherein the touch-sensitive apparatus further comprises a visibility shield which is arranged intermediate the rear surface and the angular filter, the visibility shield being configured to block light that is visible to the human eye and to transmit at least part of said light in the infrared wavelength region.

In one embodiment, each light emitter is optically connected to the light transmissive panel via an angular filter which is applied to an incoupling region on at least one of the front and rear surfaces and is configured to transmit light from the respective light emitter only within a confined range of angles inside the light transmissive panel. The confined range of angles of the angular filter on the incoupling region may be matched to the confined range of angles of the angular filter on the outcoupling region, e.g. by the angular filter on the incoupling region being identical to the angular filter on the outcoupling region. In one embodiment, the touch-sensitive apparatus, further comprises a light recycler which is arranged beneath the angular filter on the incoupling region, so as to define a light reflective enclosure with respect to the angular filter and a light-emitting surface of the respective light emitter.

A second aspect of the invention is a touch-sensitive apparatus comprising: a light transmissive panel that defines a front surface and an opposite, rear surface; a plurality of light emitters optically connected to the light transmissive panel so as to generate propagating light that propagates by total internal reflection inside the light transmissive panel across a touch-sensitive region on the light transmissive panel; and a plurality of light detectors optically connected to the light transmissive panel so as to define a grid of propagation paths across the touch-sensitive region between pairs of light emitters and light detectors; wherein the light transmissive panel is mounted onto a front surface of a display device by a lamination layer of light transmissive material which is arranged in contact with the rear surface of the light transmissive panel and the front surface of the display device; and wherein the lamination layer has a refractive index $n_{lam}$ which is smaller than a refractive index $n_{panel}$ of the light transmissive panel at the rear surface and which is chosen such that a laminate cut-off angle $\theta_{c,l}=\arcsin(n_{lam}/n_{panel})$ exceeds a critical angle $\theta_c$ which is given by $\theta_c=\arcsin(1/n_{panel})$ by an angle $\Delta\theta$, which is at least 5°, 10° or 15°.

In one embodiment, the laminate cut-off angle $\theta_{c,l}$ is equal to or larger than a first cut-off angle $\theta_w=\arcsin(n_w/n_{panel})$, with $n_w$ being the refractive index of water, $n_{panel}>n_w$.

In another embodiment, the laminate cut-off angle $\theta_{c,l}$ is equal to or larger than a second cut-off angle $\theta_f=\arcsin(n_f/n_{panel})$, with $n_f$ being the refractive index of finger fat, $n_{panel}>n_f$.

In one embodiment, the light emitters are optically coupled to the light transmissive panel such that the propagating light is generated to impinge on the lamination layer at an angle that is equal to or larger than the laminate cut-off angle $\theta_{c,l}$.

A third aspect of the invention is a touch-sensitive apparatus comprising: a light transmissive panel that defines a front surface and an opposite, rear surface; a plurality of light emitters optically connected to the light transmissive panel so as to generate propagating light that propagates by total internal reflection inside the light transmissive panel across a touch-sensitive region on the light transmissive panel; and a plurality of light detectors optically connected to the light transmissive panel so as to define a grid of propagation paths across the touch-sensitive region between pairs of light emitters and light detectors; wherein a layered light absorber is provided on the rear surface of the light transmissive panel, said layered light absorber comprising a coupling layer of light transmissive material on the rear surface of the light transmissive panel, and an absorbing layer of light-absorbing material on the coupling layer, and wherein the coupling layer has a refractive index $n_{coupl}$ which is smaller than a refractive index $n_{panel}$ of the light transmissive panel at the rear surface and which is chosen such that an absorber cut-off angle $\theta_{c,c}=\arcsin(n_{coupl}/n_{panel})$ exceeds a critical angle $\theta_c$ which is given by $\theta_c=\arcsin(1/n_{panel})$ by an angle $\Delta\theta$, which is at least 5°, 10° or 15°.

In one embodiment, the absorber cut-off angle $\theta_{c,c}$ is equal to or larger than a first cut-off angle $\theta_w=\arcsin(n_w/n_{panel})$, with $n_w$ being the refractive index of water, $n_{panel}>n_w$.

In another embodiment, the absorber cut-off angle $\theta_{c,c}$ is equal to or larger than a second cut-off angle $\theta_f=\arcsin(n_f/n_{panel})$, with $n_f$ being the refractive index of finger fat, $n_{panel}>n_f$.

In one embodiment, the light emitters are optically coupled to the light transmissive panel such that the propagating light is generated to impinge on the coupling layer at an angle that is equal to or larger than the absorber cut-off angle $\theta_{c,c}$.

In one embodiment, the layered light absorber is arranged to overlap a major part, or essentially all, of the touch-sensitive region.

It is realized that any one of the embodiments of the first aspect may be adapted and implemented as an embodiment of the second and third aspects. For example, each light detector may be optically connected to the light transmissive panel via an angular filter which is applied to an outcoupling region on at least one of the front and rear surfaces and is configured to transmit the propagating light only within a confined range of angles with respect to the normal of the outcoupling region, wherein the confined range may extend from a lower angle limit $\theta_{min}$ to an upper angle limit $\theta_{max}$, and wherein the lower angle limit $\theta_{min}$ may be equal to or larger than a critical angle $\theta_c$, which is given by $\theta_c=\arcsin(1/n_{panel})$, with $n_{panel}$ being the refractive index of the light transmissive panel at the outcoupling region.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1:
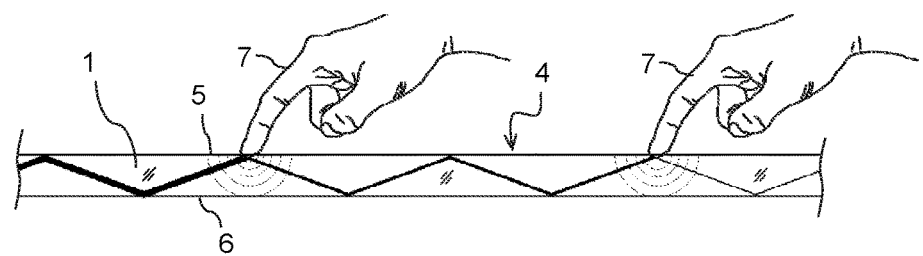
FIG. 1 is a section view of a light transmissive panel to illustrate the principle of using TIR for touch detection.

In the following, various inventive light coupling structures will be presented as installed in an exemplifying TIR-based projection-type touch-sensitive apparatus. Throughout the description, the same reference numerals are used to identify corresponding elements.

1. Touch-Sensitive Apparatus

FIG. 1 illustrates the concept of touch detection based on attenuation of propagating light, commonly denoted FTIR (Frustrated Total Internal Reflection). According to this concept, light is transmitted inside a panel 1 along a plurality of well-defined propagation paths. The panel 1 is made of solid material in one or more layers and may have any shape. The panel 1 defines an internal radiation propagation channel, in which light propagates by internal reflections, also denoted "bounces" in the following. In the example of FIG. 1, the propagation channel is defined between the boundary surfaces 5, 6 of the panel 1, and the front surface 5 allows the propagating light to interact with touching objects 7 and thereby defines the touch surface 4. The interaction is enabled by injecting the light into the panel 1 such that the light is reflected by total internal reflection (TIR) in the front surface 5 as it propagates through the panel 1. The light may be reflected by TIR in the rear surface 6 or against a reflective coating thereon. It is also conceivable that the propagation channel is spaced from the rear surface 6, e.g. if the panel comprises multiple layers of different materials. The panel 1 may thus be made of any solid material (or combination of materials) that transmits a sufficient amount of light in the relevant wavelength range to permit a sensible measurement of transmitted energy. Such material includes glass, poly(methyl methacrylate) (PMMA) and polycarbonates (PC). The panel 1 typically has a refractive index in the range of 1.3-1.7. For example, PMMA has a refractive index of about 1.5 and PC has a refractive index of about 1.6 in the near infrared (NIR). The panel 1 may be designed to be overlaid on or integrated into a display device or monitor (not shown).

As shown in FIG. 1, an object 7 that is brought into close vicinity of, or in contact with, the touch surface 4 may interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local attenuation or "frustration" of the total internal reflection, which leads to a decrease in the energy (or equivalently, the power or intensity) of the transmitted light, as indicated by the thinned lines to the right of the touching objects 7 in FIG. 1.

Figure 2:
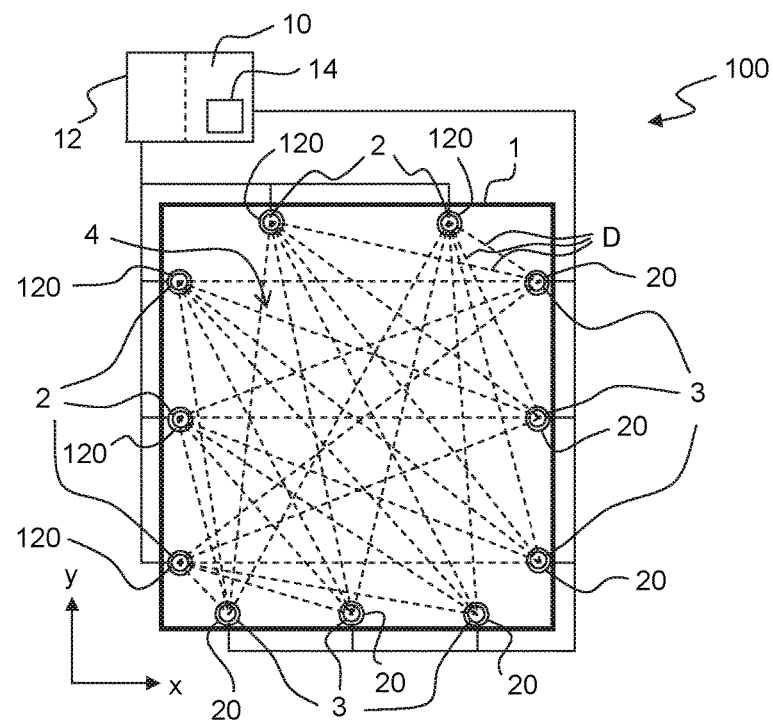
FIG. 2 is a top plan view of an exemplifying touch-sensitive apparatus.

FIG. 2 illustrates an example embodiment of a touch-sensitive apparatus 100 that is based on the concept of FTIR. Emitters 2 are distributed along the perimeter of the touch surface 4, beneath the panel 1, to project light onto an incoupling structure on the panel 1 such that at least part of the light is captured inside the panel 1 for propagation by internal reflections in the propagation channel. Detectors 3 are distributed along the perimeter of the touch surface 4, beneath the panel 1, and are optically coupled to the panel 1 so as to receive part of the propagating light from a respective outcoupling structure. The light from each emitter 2 will thereby propagate inside the panel 1 to a number of different detectors 3 on a plurality of light propagation paths D. Even if the light propagation paths D correspond to light that propagates by internal reflections inside the panel 1, the light propagation paths D may conceptually be represented as "detection lines" that extend across the touch surface 4 between pairs of emitters 2 and detectors 3, as indicated by dashed lines in FIG. 2. Thus, the detection lines correspond to a projection of the propagation paths onto the touch surface 4. Thereby, the emitters 2 and detectors 3 collectively define a grid of detection lines ("detection grid") on the touch surface 4, as seen in a top plan view. It is appreciated that FIG. 2 is an example, and that a (significantly) larger number of emitters 2 and/or detectors 3 may be included in the apparatus 100. Also, the distribution of emitters 2 and detectors 3 may differ.

As used herein, the emitter 2 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 2 may also be formed by the end of an optical fiber. The emitters 2 may generate light in any wavelength range. The following examples presume that the light is generated in the near infrared (NIR), i.e. at wavelengths of about 750 nm-1400 nm. Analogously, the detector 3 may be any device capable of converting light (in the same wavelength range) into an electrical signal, such as a photo-detector, a CCD device, a CMOS device, etc.

The detectors 3 collectively provide an output signal, which is received and sampled by a signal processor 10. The output signal contains a number of sub-signals, also denoted "projection signals", each representing the energy of light received by a certain light detector 3 from a certain light emitter 2. Depending on implementation, the signal processor 10 may need to process the output signal for separation of the individual projection signals. The projection signals represent the energy, intensity or power of light received by the detectors 3 on the individual detection lines D. Whenever an object touches a detection line, the received energy on this detection line is decreased ("attenuated").

Figure 3:
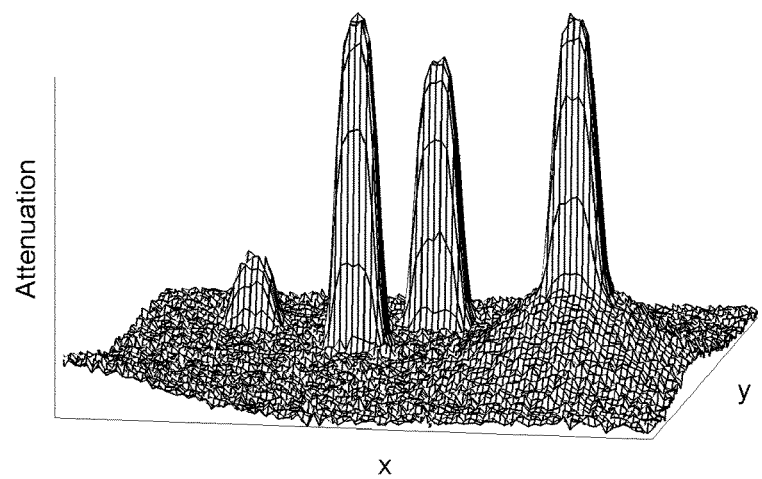
FIG. 3 is a 3D plot of an attenuation pattern generated based on energy signals from a TIR-based projection-type touch-sensitive apparatus.

The signal processor 10 may be configured to process the projection signals so as to determine a property of the touching objects, such as a position (e.g. in the x,y coordinate system shown in FIG. 2), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 3, where the peaks of increased attenuation represent touching objects. The attenuation pattern may be further processed by the signal processor 10 or by a separate device (not shown) for determination of the position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such and other reconstruction functions designed for use in touch determination are found in WO2009/077962, WO2011/049511, WO2011/139213, WO2012/050510, WO2013/062471, WO2013/133757, WO2013/165305 and WO2013/165306, all of which are incorporated herein by reference.

In the illustrated example, the apparatus 100 also includes a controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. The signal processor 10 and the controller 12 may be configured as separate units, or they may be incorporated in a single unit. One or both of the signal processor 10 and the controller 12 may be at least partially implemented by software executed by a processing unit 14, such as a CPU.

Embodiments of structures for outcoupling and detection of light will now be explained in detail with reference to FIGS. 4-12. Generally, these embodiments are presented in the context of the touch-sensitive apparatus shown in FIG. 2.

2. Outcoupling Structure

Figure 4:
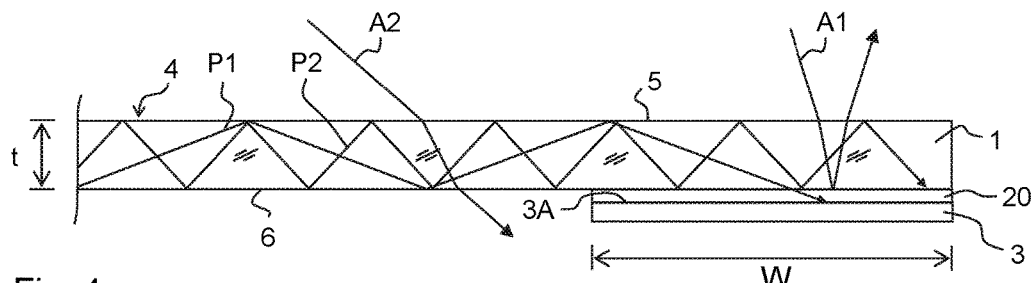
FIG. 4 is a section view of a light outcoupling structure according to a first embodiment.
Figure 5A:
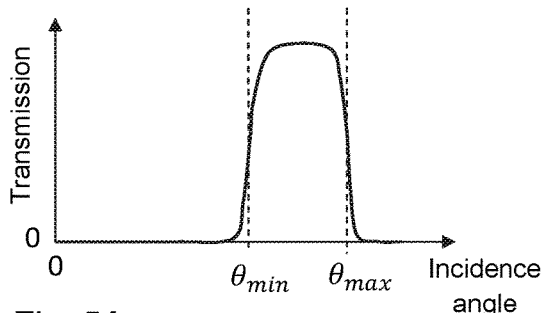
FIG. 5A is a plot of transmission as a function of incidence angle for an angular filter included in the first embodiment.
Figure 5B:
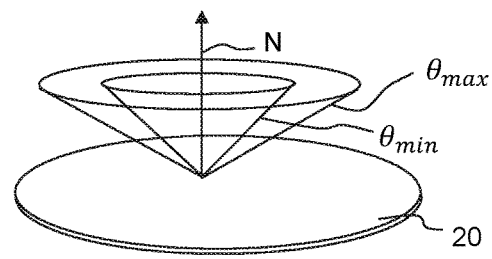
FIG. 5B is a perspective view of the range of angles that are transmitted by the angular filter.

FIG. 4 illustrates a section that may be taken along any one of the detection lines D of the touch-sensitive apparatus in FIG. 2. For simplicity, only a portion of the apparatus at and around the outcoupling structure is shown. The outcoupling structure is made up of a sheet-like angular filter 20 which is applied with its front face to the panel 1 at the periphery of the touch surface 4 to define an outcoupling port for the light propagating in the panel 1. A detector 3 is applied with its light-sensing surface 3A onto the rear face of the angular filter 20. In an alternative (not shown), a spacer of light transmissive material is disposed between the surface 3A and the filter 20. The angular filter 20 is designed to only be transmissive to light within a given angular range, i.e. for light that impinges on the filter 20 at certain angles of incidence to the normal N (FIG. 5B) of the filter 20. FIG. 5A is a plot of the transmission of the filter 20 as a function of angle of incidence. As seen, the filter 20 transmits light within a given angular range between a lower limit $\theta_{min}$ and an upper limit $\theta_{max}$, while reflecting light that impinges on the filter at other angles of incidence. Any criterion may be used for defining the limits $\theta_{min}$, $\theta_{max}$, e.g. a percentage (e.g. 25, 50 or 75) of absolute or maximum transmission. FIG. 5B illustrates the angular range in relation to a single position on the front surface of the filter 20. As seen, the angular range is equal in all directions in the plane of the filter 20. Preferably, the angular range is essentially the same at all positions on the filter 20.

It should be understood that the filter 20 need not be designed to define the given angular range for all wavelengths, but only for a limited wavelength range that includes the wavelength(s) of the propagating light. In a preferred embodiment, the angular filter 20 is reflective to all angles outside the limited wavelength range. In one example, the propagating light has a wavelength 850 nm with a bandwidth of 20 nm, and the filter 20 is designed to have an angular range [$\theta_{min}$-$\theta_{max}$] in the wavelength range of 800-900 nm, and to be reflective to light at wavelengths from 400 nm to 800 nm, and possibly also at wavelengths above 900 nm, irrespective of angle of incidence. Alternatively, a dedicated wavelength filter may be installed in front of or behind the angular filter 20 to be absorbing or reflective to incoming light outside the limited wavelength range, for all angles of incidence.

It should also be understood that the filter 20 is designed to provide the angular range [$\theta_{min}$-$\theta_{max}$] for a specific installation, i.e. when mounted with its front face to the panel 1 and with its rear side to the surface 3A (or a spacer). For example, the design may be adapted to the refractive index of the panel 1 and the refractive index of the light-sensing surface 3A (or the spacer).

The filter 20 may be designed as a dielectric multilayer structure of at least two different materials, similar to an interference filter. It lies within the reach of the person skilled in optical design to select appropriate materials and number of layers to achieve the desired angular range for light at a wavelength generated by the emitters 2.

In embodiments of the invention, the filter 20 is tailored to suppress the amount of ambient light received at the light-sensing surface 3A in relation to the amount of useful light, i.e. light that has propagated on one or more detection lines from a respective incoupling structure. This effect may be achieved by adapting the angular range of the filter 20 to the angles of incidence (AOI) of the propagating light on the filter 20. Ambient light typically contains daylight and/or light from artificial light sources. Such ambient light includes NIR light which, if it falls on the surface 3A, will interfere with the detection of the propagating NIR light inside the panel 1. As exemplified by ray A1 shown in FIG. 4, ambient light that falls on the front surface 5 is refracted into the panel 1 and would have impinged on the surface 3A were it not for the angular filter 20. The angular filter 20 is designed to reflect the ambient light A1 back towards the front surface 5. As exemplified by ray P1, light that propagates in the panel 1 by TIR and strikes the filter at an AOI within the angular range of the filter 20, is transmitted to the light-sensing surface 3A. FIG. 4 also indicates a ray P2 that propagates in the panel 1 by TIR and strikes the filter 20 at a smaller AOI, which is outside the angular range of the filter 20. This ray P2 is reflected by the filter 20. Any ambient light that falls onto the touch surface 4 will, irrespective of its angle to the touch surface 4, be transmitted through the panel 1, as exemplified by ray A2. The ambient light will not be captured by TIR in the panel 1 since it cannot be refracted into the panel 1 at an angle larger the critical angle (see below).

The use of an angular filter 20 provides a simple technique for selecting the light that is passed to the detector 3 to be represented in the projection signals. The angular filter 20 allows the apparatus 100 to be manufactured with relative ease at low cost and high reliability.

Figure 6:
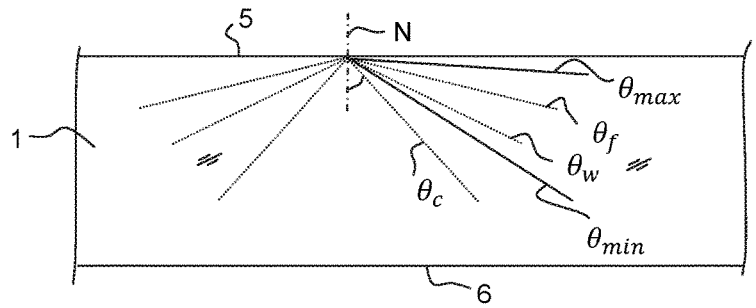
FIG. 6 is a section view to illustrate characteristic angles of the angular filter and characteristic angles of the panel.

The present Applicant has realized that advantageous technical effects may be achieved by careful selection of the lower limit $\theta_{min}$ of the filter 20. FIG. 6 illustrates, in section view, a portion of the panel 1, where different characteristic angles of the panel 1, as well as the limits $\theta_{min}$, $\theta_{max}$ of the filter 20, are mapped to a position on the front surface 5. In this example, it is assumed that the panel 1 is made of a single material and has the same refractive index $n_{panel}$ at the front and rear surfaces 5, 6. All angles are defined with respect to the normal N of the front surface 5.

FIG. 6 indicates the critical angle $\theta_c$, which is given by $\theta_c = \arcsin(1/n_{panel})$ and is the minimum AOI of the light that propagates by TIR between the surfaces 5, 6. FIG. 6 also indicates a cut-off angle $\theta_w$ for interaction between the propagating light and water deposited on the front surface 5. Propagating light that strikes the surface 5 at AOIs below $\theta_w$ will be partly coupled out of the panel 1 and into water on the surface 5, whereas propagating light at AOIs above $\theta_w$ will be totally reflected at the interface between the surface 5 and water. According to Snell's law: $n_{panel} \cdot \sin(\theta_w) = n_w \cdot \sin(90°)$, which yields $\theta_w = \arcsin(n_w/n_{panel})$, where the refractive index of water, $n_w$, is in the range 1.31-1.34, depending on temperature, wavelength, salt content, etc. FIG. 6 also indicates a cut-off angle $\theta_f$ for interaction between the propagating light and finger fat deposited on the front surface 5. Propagating light that strikes the surface 5 at AOIs below $\theta_f$ will be partly coupled out of the panel 1 and into finger fat on the surface 5, whereas propagating light at AOIs above $\theta_f$ will be totally reflected at the interface between the surface 5 and finger fat. According to Snell's law: $n_{panel} \cdot \sin(\theta_f) = n_f \cdot \sin(90°)$, which yields $\theta_f = \arcsin(n_f/n_{panel})$, where the refractive index of finger fat, $n_f$, typically is in the range of 1.36-1.48, depending on temperature, wavelength, composition, etc. Measurement results presented in "Some observations on fingerprint deposits", by G L Thomas and T E Reynoldson, published in J. Phys. D: Appl. Phys, Vol. 8, pp 724-729 (1975), indicate that $n_f$ may be distributed over the range of 1.40-1.54, with a histogram peak at 1.48-1.50.

Even if the cutoff angles $\theta_w$ and $\theta_f$ may not have universally applicable values, given that the refractive indices of water and finger fat fall within a respective range, it is possible to conduct experiments to determine an average or an otherwise representative value of $n_w$ and $n_f$, respectively, for a particular use case. The examples herein assume $n_w = 1.33$ and $n_f = 1.45$-1.46. For a panel made of soda-lime glass with $n_{panel} = 1.51$, assuming $n_w = 1.33$ and $n_f = 1.46$, the cutoff angles are $\theta_c = 41.5°$, $\theta_w = 62°$, and $\theta_f = 75°$. For a panel made of PMMA with $n_{panel} = 1.49$, assuming $n_w = 1.33$ and $n_f = 1.45$, the cutoff angles are $\theta_c = 42°$, $\theta_w = 63°$, and $\theta_f = 77°$.

In one embodiment, the angular range of the filter 20 is set to $\theta_{min} \approx \theta_c < \theta_{max} < 90°$. This will ensure that all propagating light reaches the light-sensing surface 3A while preventing a major part of the ambient light from striking the light-sensing surface 3A.

Further suppression of interferences, i.e. unwanted signal components at the light-sensing surface 3A, may be achieved by setting $\theta_{min}$ to exceed $\theta_c$.

Figure 7:
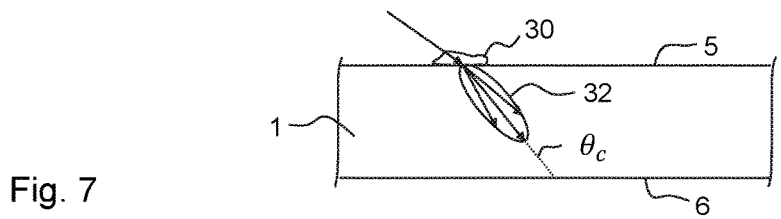
FIG. 7 is a section view to illustrate incoupling of ambient light via contamination on the touch surface.

In one such embodiment, the angular range is set to $\theta_{min} = \theta_c + \Delta\theta < \theta_{max} < 90°$, with $\Delta\theta$ equal to, or larger than, e.g. 5°, 10° or 15°. This embodiment has been found to reduce the influence of ambient light that is coupled into the panel 1 through deposits on the touch surface 4, such as water, saliva, fingerprints, smear, etc (collectively denoted "contamination" or "surface contamination" herein). With reference to ray A2 in FIG. 4, it was mentioned that all ambient light that falls onto the touch surface 4 will pass through the panel 1. However, the present Applicant has found that this is only true for a perfectly clean touch surface 4. As indicated in FIG. 7, contamination 30 on the touch surface 4 may allow ambient light at an angle of incidence near or larger than $\theta_c$ to leak into the panel 1 and be trapped by TIR therein. The present Applicant has realized that this ambient light may have a sizeable influence on the measured signal levels at the detector 3. The Applicant has also found, surprisingly, that the trapped ambient light is largely concentrated to a limited range of AOIs at the filter 20, close to and above the critical angle $\theta_c$. Thus, a portion of the trapped ambient light may be prevented from reaching the detector 3 by choosing $\theta_{min} = \theta_c + \Delta\theta$ with an angular span $\Delta\theta$ equal to or larger than the limited range of AOIs. It is currently believed that the concentration of the ambient light to the limited range of AOIs is caused by Mie scattering in the contamination 30, as well as refraction by contamination droplets, causing the ambient light to enter the panel with a slightly widened distribution, as indicated by 32 in FIG. 7. The widening due to Mie scattering and refraction in contamination droplets may be in the range of ±5° to ±10°. The ambient light typically falls onto the contamination 30 at many different angles. Since all ambient light that enters the panel 1 at an angle below $\theta_c$ will pass through the panel 1 and since the intensity of the ambient light typically decreases with increasing angle to the normal N of the panel, the trapped ambient light will be concentrated at and slightly above $\theta_c$. It should also be noted that if the refractive index of the panel 1 is larger than the refractive index of the contamination 30: $n_{panel} > n_{cont}$, the AOIs for the ambient light refracted into the panel 1 via the contamination 30 cannot exceed $\arcsin(n_{cont}/n_{panel})$.

The present Applicant has found that further advantageous and unexpected effects are achieved by designing the filter 20 with a given relation between the lower limit $\theta_{min}$ and the cut-off angle $\theta_w$ or $\theta_f$.

In one such embodiment, the angular range is set to $\theta_{min} \leq \theta \leq \theta_{max}$, where $\theta_{min} \geq \theta_w$ and $\theta_{max} < 90°$. Thus, the filter 20 is designed to only transmit light with AOIs that are equal to or larger than the cut-off angle $\theta_w$ for water. This embodiment has the ability of significantly reducing the influence on the resulting projection signals from water-containing deposits on the touch surface 4. As noted above, the portion of the propagating light that strikes water at AOIs below $\theta_w$ will be at least partially coupled out of the panel 1 and interact with the water. Thus, the portion of the propagating light that reaches the filter 20 at AOIs below $\theta_w$ has been significantly more attenuated by water than the remainder of the propagating light. This embodiment also has the ability of reducing the impact of differences in finger interaction between users and even between fingers of a single user. These differences may make it difficult to properly detect all touching objects on the touch surface, and it may require the signal processor 10 to be configured with a large dynamic range for retrieving and processing the projection signals. A significant part of the differences in finger interaction has been found to emanate from different moisture levels on the fingers. The filter design of this embodiment will suppress the influence of moisture in the projection signals and thus reduce the impact of differences in finger interaction.

In this embodiment, the propagating light that is transmitted by the filter 20 has impinged on the touch surface 4 with AOIs at or above $\theta_w$. At these AOIs, the propagating light will still be coupled into the outermost layer of the finger that form part of the epidermis, since this layer (stratum corneum) is known to have a refractive index of about 1.55 in the infrared, e.g. according to measurement results presented in "*A survey of some fundamental aspects of the absorption and reflection of light by tissue*", by R. J. Scheuplein, published in J. SOC. COS. CHEM. 15, 111-122 (1964), and "*The optics of human skin*", by Anderson and Parrish, published in Journal of Investigative Dermatology 77, 1, 13-19 (1981). This means that propagating light is coupled into the finger for AOIs at least up to a cutoff angle $\theta_{sc} = \arcsin(1.55/n_{panel})$. If $n_{panel} \leq 1.55$, the cutoff angle $\theta_{sc}$ is not relevant, and all AOIs below 90° will interact with the stratum corneum (and other outer layers of the finger). If $n_{panel} > 1.55$, it is conceivable to set $\theta_{max} \leq \theta_{sc}$ for the filter 20, should there be a need to suppress propagating light at AOIs above $\theta_{sc}$.

It should also be noted that this embodiment may eliminate, or at least significantly suppress, ambient light that has been coupled into the panel via water on the touch surface 4 and has propagated by TIR to the filter 20. As explained above, this ambient light has a maximum AOI of arcsin $(n_{cont}/n_{panel})$, which is equal to $\theta_w$ with $n_{cont} = n_w$.

In another embodiment, the angular range is set to $\theta_{min} \leq \theta \leq \theta_{max}$, where $\theta_{min} \geq \theta_f$ and $\theta_{max} < 90°$. This embodiment has the ability of significantly reducing the influence on the resulting projection signals from deposits containing finger fat, e.g. fingerprints, on the touch surface 4. Fingerprints are typically a substantial part of the contamination on the touch surface, and a major concern when processing the projection signals for detecting the touching objects. It is thus a significant technical achievement to be able to suppress the influence of fingerprints, and it will reduce the requirements on the signal processor 10 to track and compensate for surface contamination. This embodiment also has the ability of further reducing the impact of differences in finger interaction, since it suppresses the interaction caused by fat on the fingers. Furthermore, this embodiment may essentially eliminate, or at least significantly suppress, ambient light that has been coupled into the panel via finger fat on the touch surface 4 and has propagated by TIR to the filter 20. This ambient light has a maximum AOI of arcsin $(n_{cont}/n_{panel})$, which is equal to $\theta_f$ with $n_{cont} = n_f$.

Reverting to FIG. 4, the width W of the filter 20 (in the direction of the respective detection line) may be optimized with respect to the range of AOIs of the propagating light that should be transmitted onto the light-sensing surface 3A. To ensure that all of this propagating light (i.e. the light with appropriate AOIs) strikes the filter at least once, the width W may be set to exceed the relevant minimum distance between bounces in the rear surface ("minimum bounce distance"). If the panel is made of a single material, the minimum bounce distance is given by $2 \cdot t \cdot \tan(\theta_{min})$, where t is the thickness of the panel 1. To achieve a consistent detection of the propagating light within the limits $\theta_{min}$, $\theta_{max}$, it may be desirable to set the width to exceed the relevant maximum distance between bounces in the rear surface ("maximum bounce distance"). If the panel is made of a single material, the maximum bounce distance is given by $2 \cdot t \cdot \tan(\theta_{max})$. In practice, the width W may be given by other design considerations, which may (but need not) set the limit $\theta_{max}$ of the filter 20. Further, the skilled person is able to calculate the minimum bounce distance and the maximum bounce distance for a panel consisting of more than one layer.

Figure 8:
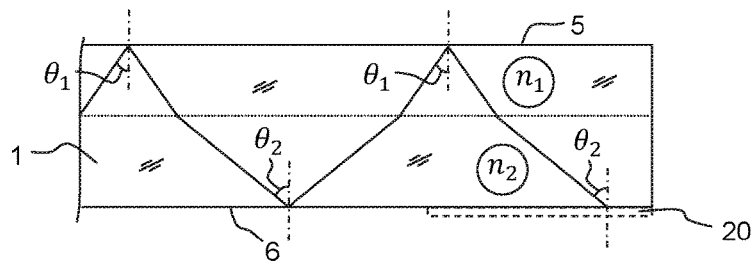
FIG. 8 is a section view to illustrate a relation between bounce angles in a two-layer panel.

The foregoing design rules for the angular filter were given for a panel 1 with a single index of refraction. However, corresponding design rules are applicable for the angular filter 20 when applied to a panel 1 made up of two or more layers with different index of refraction. FIG. 8 illustrates a panel 1 formed by a top layer with index of refraction $n_1$ and a bottom layer with index of refraction $n_2$. Light having an angle of incidence $\theta_1$ at the front surface 5 will impinge on the rear surface 6 with an angle of incidence $\theta_2 = \arcsin(n_1/n_2 \cdot \sin(\theta_1))$. This means that the limits $\theta_{min}$, $\theta_{max}$ of the filter 20, if mounted on the rear surface 6, should be set with respect to the critical angle $\theta_c$ at the front surface 5 as represented at the rear surface 6, or with respect to the cut-off angles $\theta_w$, $\theta_f$ at the front surface 5 as represented at the rear surface 6. The skilled person realizes that $n_{panel}$ in the above expressions for $\theta_c$, $\theta_w$ and $\theta_f$ is the refractive index of the panel 1 at the outcoupling region where the filter is mounted. In the example of FIG. 8, $n_{panel} = n_2$.

Figure 9A:
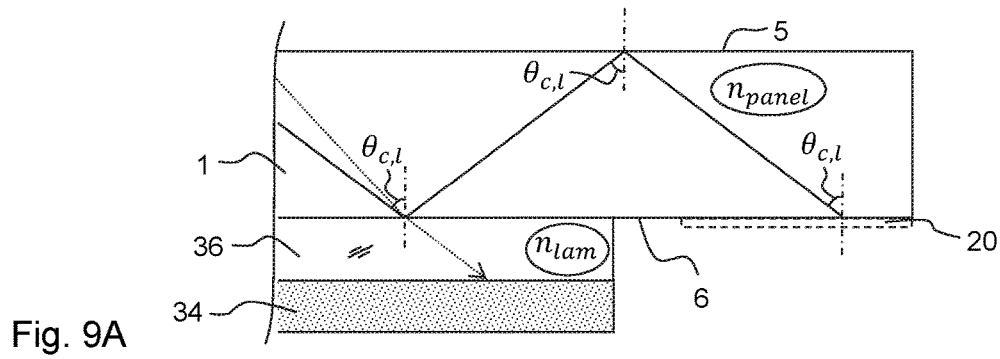
FIG. 9A is a section view to illustrate bounce angles in a panel which is laminated to a display device.

A different situation may arise if the panel 1 is laminated to a display 34 by means of a lamination layer 36 of light transmissive material, as shown in FIG. 9A. If the display 34 does not reflect light back to the panel 1, the lamination layer 36 may be designed with a smaller refractive index $n_{lam}$ than the panel. This will cause light that impinges on the interface between the panel and the lamination layer 36 at angles equal to $\theta_{c,l} = \arcsin(n_{lam}/n_{panel})$, or larger, to be totally reflected at this interface. Light that impinges on the interface at smaller angles, e.g. as indicated by a dotted arrow in FIG. 9A, will be transmitted via the lamination layer 36 to the display 34. This means that the minimum AOI of the light that propagates by TIR between the surfaces 5, 6 and strikes the filter 20, is $\theta_{c,l}$ rather than $\theta_c$. In such an embodiment the angular range of the filter 20 may be set according to $\theta_{min} \le \theta \le \theta_{max}$, where $\theta_{min} \ge \theta_{c,l}$ and $\theta_{max} < 90°$. Of course, the angular range may instead be designed with respect to $\theta_w$ or $\theta_f$ according to the embodiments described above.

It should be noted that a lamination layer 36 may generally be introduced between the rear surface 6 of the panel 1 and any external device when it is desirable to "optically isolate" the propagating light in panel from the external device, whereby the propagating light is shifted to larger angles of incidence by virtue of $\theta_{c,l} > \theta_c$. Based on the foregoing discussion, it is understood that it may be desirable to select the material of the lamination layer 36 such that $\theta_{c,l} \ge \theta_w$ or $\theta_{c,l} \ge \theta_f$ so as to reduce the attenuation caused by contamination on the touch surface 4. In another variant, it may be desirable to select the material of the lamination layer 36 such that $\theta_{c,l} \ge \theta_c + \Delta\theta$, where $\Delta\theta$ is selected to reduce the influence of ambient light that enters the panel via contamination on the touch surface 4, as discussed above with reference to FIG. 7.

Figure 9B:
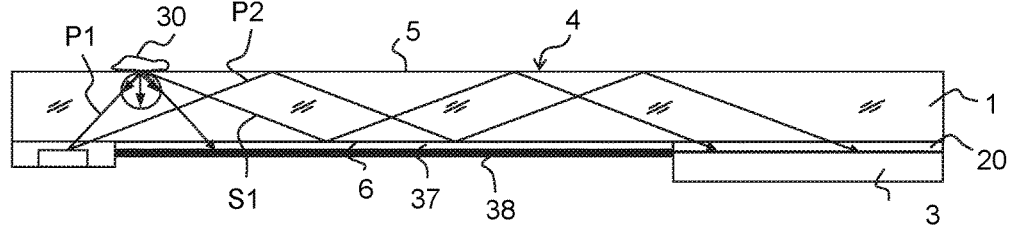
FIG. 9B illustrates a panel with a layered light absorber between light incoupling and outcoupling structures to control bounce angles for propagating light in the panel.

A similar concept may be implemented even if the panel 1 is not laminated to a display 34. This concept is illustrated in FIG. 9B, in which an assembly of layers 37, 38 is applied to the rear surface 6 to extend between an incoupling structure, which couples an emitter 2 to the panel 1, to an outcoupling structure, which couples a detector 3 to the panel 1, in this example via an angular filter 20. A coupling layer 37 of light transmissive material is applied to the rear surface 6 and a light absorbing layer 38 is applied to the coupling layer 37. The layers 37, 38 may be provided as thin, sheet-like elements. The light absorbing layer 38 absorbs at least in the wavelength range of the light injected by the emitter 2 and is preferably transmissive in the visible wavelength range so that e.g. an underlying display may be seen through the front surface 5. Such a display may be either spaced from or attached (laminated) to the absorbing layer 38. The refractive index $n_{coupl}$ of the coupling layer 37 may be tailored in relation to the refractive index $n_{panel}$ of the panel 1, so as to selectively define the minimum AOI of the light that propagates in the panel 1. Thus, if the coupling layer 37 is designed with a smaller refractive index $n_{coupl}$ than the panel, the minimum AOI of the light that propagates by TIR between the surfaces 5, 6 and reaches the outcoupling site is $\theta_{c,c} = \arcsin(n_{coupl}/n_{panel})$ rather than $\theta_c$. It is understood that the material of the coupling layer 37 may be selected such that $\theta_{c,c} \ge \theta_w$ or $\theta_{c,c} \ge \theta_f$ so as to reduce the attenuation caused by contamination on the touch surface 4. In another variant, the material of the coupling layer 37 may be selected such that $\theta_{c,c} \ge \theta_c + \Delta\theta$, where $\Delta\theta$ is selected to reduce the influence of ambient light that enters the panel via contamination on the touch surface 4, as discussed above with reference to FIG. 7.

Advantageous effects are obtained even if the assembly of layers 37, 38 do not extend across the entire rear surface 6 between the incoupling and outcoupling structures. For example, the assembly of layers 37, 38 may be spaced from both the incoupling structure and the outcoupling structure. Further alternatives are discussed further below with reference to FIGS. 13A-13B and FIG. 14D.

It should be noted that the concepts of using a lamination layer 36 or a coupling layer 37 to control the minimum AOI of the propagating light need not be combined with an angular filter in the outcoupling structure and/or an angular filter in the incoupling structure (see below), in order to reduce the impact of ambient light or contamination. However, such a combination may be desirable in certain implementations. For example, the angular filter 20 may be installed in the outcoupling structure to block ambient light that falls onto the front surface 5 and is refracted towards the outcoupling structure (cf. ray A1 in FIG. 4). However, it is to be understood that the impact of such ambient light may be reduced by other techniques, e.g. by modulation of the propagating light or by installing a dedicated shielding layer on the front surface 5 above the outcoupling structure. It may also be advantageous to combine a lamination layer 36 or coupling layer 37, for controlling the minimum AOI of the propagating light, with an angular filter in the outcoupling structure, so as to relax the requirements on the layer 36, 37 and the filter 20, respectively. Thus, a less than optimal selection of the layer 36, 37 may be compensated by the angular filter 20, and vice versa. The lower limit of the filter 20 may be set as: $\theta_{min} \ge \theta_{c,c}$. Of course, the angular range may instead be designed with respect to $\theta_w$ or $\theta_f$ as described hereinabove.

It should also be noted that, for efficient utilization of light, the light emitter 2 may be coupled to the panel 1 such that the injected light impinges on the lamination layer 36 (or the coupling layer 37) at an AOI that is essentially equal to or exceeds $\theta_{c,l}$ (or $\theta_{c,c}$) to avoid that useful light is leaked into the layer 36 (or 37). Such an implementation may also serve to further reduce the impact of contamination on the front surface 5. In FIG. 9B, the incoupling structure injects a ray P1 which, in the absence of surface contamination, would be specularly reflected at the front surface 5 and then coupled into layer 37 and absorbed by layer 38. However, as illustrated, the ray P1 strikes the contamination 30 on the front surface 5, and some of the resulting scattered light, represented by ray S1, may propagate to the outcoupling site. If sensed by the detector 3, the scattered light S1 might disrupt the detection of touches. It is understood that the impact of contamination is reduced if the incoupling structure is designed such that a major portion, or ideally all, of the injected light is injected at angles that sustain propagation in the panel 1, represented by ray P2 in FIG. 9B.

Figure 16:
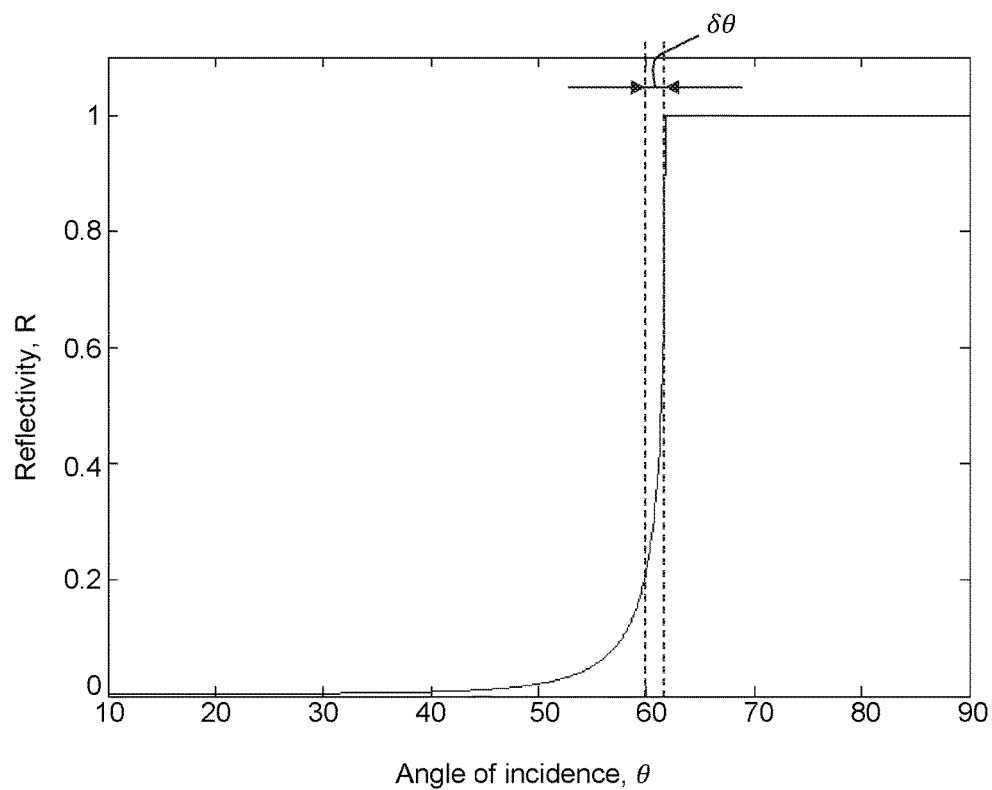
FIG. 16 is a graph of light reflectivity at a panel-water interface as a function of angle of incidence inside the panel.

In the foregoing, it has been assumed that the cutoff angles $\theta_w$ and $\theta_f$ are given by the TIR angle at the interface between the panel and water and finger fat, respectively. However, it shall be appreciated that the TIR angles correspond to 100% reflection at the interface, and that the reflectivity at the interface does not exhibit a step change at the TIR angle but is a continuous, but steep, function within increasing AOI until the TIR angle. This is illustrated in FIG. 16, which is a graph of the reflectivity R at a panel-to-water interface as a function of AOI, $\theta$, given by the equations:

$$R_p = \left| \frac{n_{panel} * \cos\theta - n_w * \sqrt{1 - \left(\frac{n_{panel}}{n_w}\sin\theta\right)^2}}{n_{panel} * \cos\theta + n_w * \sqrt{1 - \left(\frac{n_{panel}}{n_w}\sin\theta\right)^2}} \right|^2$$

$$R_s = \left| \frac{n_{panel} * \sqrt{1 - \left(\frac{n_{panel}}{n_w}\sin\theta\right)^2} - n_w * \cos\theta}{n_{panel} * \sqrt{1 - \left(\frac{n_{panel}}{n_w}\sin\theta\right)^2} + n_w * \cos\theta} \right|^2$$

$$R = \frac{R_s + R_p}{2}$$

with $n_{panel}=1.51$ and $n_w=1.33$.

As understood from FIG. 16, it is possible to define the cutoff angles $\theta_w$ and $\theta_f$ at a given fraction of 100% reflection, e.g. 0.25 or 0.50, while still achieving an essentially complete suppression of the influence of water and finger fat, respectively. In practice, this means that it is possible to adjust the cutoff angles slightly from the TIR angles towards smaller AOIs: $\theta_w=\arcsin(n_w/n_{panel})-\delta\theta$ and $\theta_f=\arcsin(n_f/n_{panel})-\delta\theta$, where $\delta\theta$ is typically less than 2°. As used herein, any reference to $\theta_w$ and $\theta_f$ is intended to inherently include this minor shift $\delta\theta$.

Generally, it may be desirable to limit the size of the individual detectors 3, and specifically the extent of the light-sensing surface 3A. For example, the cost of light detectors may increase with size. Also, a larger detector typically has a larger capacitance, which may lead to slower response (longer rise and fall times) of the detector. It is realized that it may be difficult to reduce the extent W of the detector 3 in the embodiment of FIG. 4, without sacrificing the ability to consistently detect the propagating light.

Figure 10A:
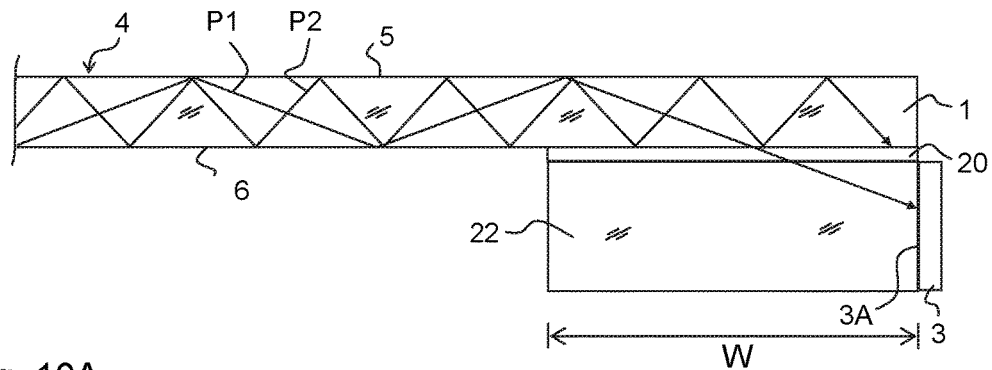
FIG. 10A is a section view of a light outcoupling structure according to a second embodiment.

FIG. 10A illustrates an alternative embodiment that at least partly overcomes this problem. Like in FIG. 4, the angular filter 20 is applied to the rear surface 6, but the detector 3 is arranged with its light-sensing surface 3A essentially perpendicular to the main extent of the panel 1. As used herein, "essentially perpendicular" is intended to include deviations of about ±20° or less from perpendicular. A spacer 22 is disposed between the angular filter 20 and the light-sensing surface 3A. The spacer 22 may be made of any suitable light transmissive material, such a plastic material or glass, or a silicone compound, a glue, a gel, etc. In the example of FIG. 10A, the spacer 22 is made of the same material as the panel 1, i.e. $n_{spacer}=n_{panel}$. By arranging the surface 3A vertically, the extent of the surface 3A may be reduced significantly compared to the embodiment in FIG. 4. When the extent of the angular filter is W, the minimum vertical extent of the surface 3A may be given by W/tan($\theta_{min}$) to ensure that all of the transmitted light from the filter 20 is received at the surface 3A. The extent of the surface 3A may be reduced further by selecting the material of the spacer 22 such that $n_{spacer}<n_{panel}$, causing the transmitted light to be refracted away from the normal and resulting in a smaller projected height at the location of the surface 3A.

Even if the outcoupling structure in FIG. 10A allows for a smaller light-sensing surface 3A, the extent of the surface 3A is still dependent on the angular range of the filter 20. Further, the vertical extent of the surface 3A has a direct impact on the thickness of the apparatus 100. At present, the embodiment in FIG. 10A is believed to be useful only when $\theta_{min}$ is larger than about 45°, to avoid that the height of the outcoupling structure becomes excessive.

Figure 10B:
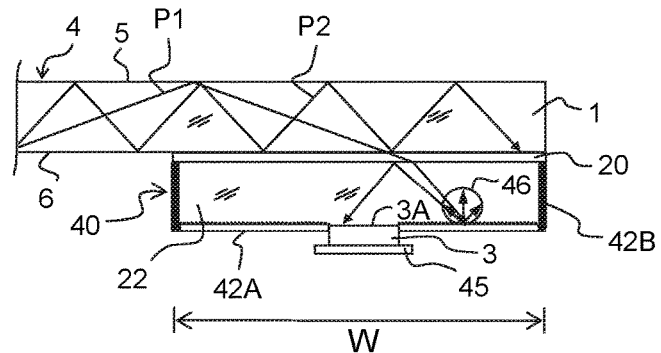
FIGS. 10B-10C are section and plan views of a light outcoupling structure according to a third embodiment.
Figure 10C:
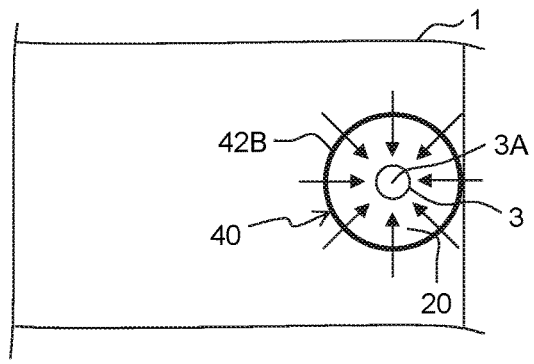

This problem is at least partly overcome by the embodiment illustrated in FIGS. 10B-10C. As shown in section in FIG. 10B, the angular filter 20 is applied to the rear surface 6, and a light recycler 40 is arranged beneath the filter 20 in surrounding relationship to the light-sensing surface 3A. The recycler 40 is designed to internally reflect the light that is transmitted by the filter 20 and to modify the angular distribution of the transmitted light. The recycler 40 defines a reflective enclosure around the light-sensing surface 3A. The enclosure is filled by a spacer material 22, e.g. any of the spacer materials discussed in relation to FIG. 10A. The recycler 40 comprises a reflective bottom surface 42A with an opening for the detector 3 (illustrated as mounted on a PCB 45) and reflective sidewalls 42B that extend from the bottom surface 42A to the filter 20. In the illustrated embodiment, the bottom surface 42A is diffusively reflective to impinging light, whereas the sidewalls 42B are specularly reflective to impinging light. As used herein, "specular reflection" is given its ordinary meaning, which refers to the mirror-like reflection of light from a surface, in which light from a single incoming direction (a ray) is reflected into a single outgoing direction. Specular reflection is described by the law of reflection, which states that the direction of incoming light (the incident ray) and the direction of outgoing light reflected (the reflected ray) make the same angle with respect to the surface normal, and that the incident, normal, and reflected directions are coplanar. As used herein, "diffuse reflection" is given its ordinary meaning, which refers to reflection of light from a surface such that an incident ray is reflected at many angles rather than at just one angle as in specular reflection. The diffuse reflection is also known as "scattering". The skilled person appreciates that many surfaces/elements/materials exhibit a combination of specular and diffuse reflection. As used herein, a surface is considered "diffusively reflective" when at least 20% of the reflected light is diffuse. The relation between diffuse and specular reflection is a measurable property of all surfaces/elements/materials.

To exemplify the function of the outcoupling structure, FIG. 10B illustrates a single ray P1 that is transmitted and refracted into the recycler 40 by the filter 20. The ray strikes the bottom wall 42A and is diffusively reflected, as indicated by the encircled rays 46. The diffusively reflected light spreads over a large solid angle in the recycler 40, and some of this light is specularly reflected by the filter 20 onto the light-sensing surface 3A. Although not shown, other parts of the diffusively reflected light is likely to undergo further reflections in the recycler 40, against the sidewalls 42B, the angular filter 20 and the bottom wall 42A, and eventually impinge on the surface 3A. It should be noted that the angular filter 20 will also transmit light from the recycler 40 back into the panel 1, specifically light that has an angle of incidence within a given angular range which may, but need not, be identical to the angular range [$\theta_{min}$-$\theta_{max}$]. If these angular ranges are identical, or at least substantially overlapping, it is necessary to redistribute the light by diffuse reflection inside the recycler 40 to prevent that the light that enters the recycler 40 from the panel 1 escapes back into the panel 1 via the filter 20. If the filter 20 is designed such that the angular ranges are sufficiently different (cf. FIG. 10E, below), the recycler 40 may be configured with only specularly reflective walls 42A, 42B.

In the embodiment of FIG. 10B, the use of specular side walls 42B ensures that all of the light that enters the recycler 40 via the filter 20 is re-directed by specular reflection(s) towards the bottom of the recycler 40, where it is either redistributed by diffuse reflection in the bottom wall 42A or directly received by the light-sensing surface 3A. The diffusively reflected light is typically, but not necessarily, emitted with a main direction that is perpendicular to the bottom wall 42A, as shown in FIG. 10B. The bottom wall 42A may e.g. be a near-Lambertian diffuser. The use of a planar bottom wall 42A, as in FIG. 10B, ensures that most of the diffusively reflected light hits the filter 20 at AOIs outside the angular range, such that a main portion of the diffusively reflected light is reflected by the filter 20 back into the recycler 40.

In an alternative, both the bottom wall 42A and the side walls 42B are diffusively reflective. In another alternative, the side walls 42B are diffusively reflective, while the bottom surface 42A is specularly reflective. In all embodiments, it is possible that only a part of the bottom wall 42A and/or the side walls 42B is diffusively reflective. Generally, it may be advantageous to provide diffusive scattering on surfaces that are arranged such that a significant portion of the light impinging on these surfaces would otherwise be specularly reflected onto the filter 20 within the angular range.

In yet another alternative, the bottom wall 42A is not specularly or diffusively reflective, but provided with a micro-structure, which is configured to reflect and re-direct impinging light onto the light sensing-surface 3A, by specular reflection against the filter 20 and possibly by reflection against the specular side walls 42B. The micro-structure thus forms a mirror with an optical power that is tailored to the incoming light, i.e. the light that is transmitted by the filter 20 and hits the micro-structure on the bottom wall 42A, either directly or by reflection(s) in the side walls 42B. The use of specularly reflective side walls 42B may facilitate the design of the micro-structure, but it is possible to use diffusively reflective side walls 42B, or a combination thereof. The micro-structure may be implemented as a sheet-like Fresnel mirror.

Compared to the embodiments in FIG. 4 and FIG. 10A, there is no direct relation between the extent of the angular filter 20 and the required size of the light-sensing surface 3A, since the recycler 40 is designed to retain a portion of the transmitted light by internal reflections until it impinges on the surface 3A. Furthermore, there is large freedom of placing the detector 3 in relation to the recycler 40, and it can even be accommodated in a side wall 42B instead of the bottom wall 42A. It is realized that the outcoupling structure may be optimized with respect to manufacturing requirements, without any major loss in outcoupling efficiency. Also, assembly tolerances may be relaxed.

As shown in the plan view of FIG. 10C, the combination of angular filter 20 and recycler 40 will collect light from all directions in the plane of the panel 1, provided that the incoming light impinges on the angular filter 20 with AOIs within the angular range $[\theta_{min}\text{-}\theta_{max}]$. Thus, the outcoupling structure in FIG. 10C can accept light from many different directions in the plane of the panel 1 and define the end point of detection lines from different emitters (cf. FIG. 2). In the example of FIG. 10C, the recycler 40 is circular in plan view, but other shapes are possible, e.g. elliptical or polygonal. As described in relation to FIG. 4, it may be desirable that the extent W of the recycler along each of the detection lines is equal to at least the minimum bounce distance or at least the maximum bounce distance.

In all embodiments, the specularly reflective wall(s) of the recycler 40, if present, may be implemented by an external coating, layer or film which is applied to the spacer material 22, e.g. a metal such as aluminum, copper or silver, or a multilayer structure, as is well-known to the skilled person.

In all embodiments, the diffusively reflective wall(s) of the recycler 40, if present, may be implemented by an external coating, layer or film of diffusively reflective material which is applied to the spacer material 22. In one implementation, the diffusively reflective material is a matte white paint or ink. In order to achieve a high diffuse reflectivity, it may be preferable for the paint/ink to contain pigments with high refractive index. One such pigment is $TiO_2$, which has a refractive index n=2.5-2.7. It may also be desirable, e.g. to reduce Fresnel losses, for the refractive index of the paint binder (vehicle) to match the refractive index of the spacer 22. For example, depending on refractive index, a range of vehicles are available such as oxidizing soya alkyds, tung oil, acrylic resin, vinyl resin and polyvinyl acetate resin. The properties of the paint may be further improved by use of e.g. EVOQUE™ Pre-Composite Polymer Technology provided by the Dow Chemical Company. There are many other diffusively reflective coating materials that are commercially available, e.g. the fluoropolymer Spectralon, polyurethane enamel, barium-sulphate-based paints or solutions, granular PTFE, micro-porous polyester, Makrofol® polycarbonate films, GORE® Diffuse Reflector Product, etc. Also, white paper may be used. Alternatively, the diffusively reflective material may be a so-called engineered diffuser. Examples of engineered diffusers include holographic diffusers, such as so-called LSD films provided by the company Luminit LLC.

According to other alternatives, the diffusively reflective wall(s) of the recycler 40 may be implemented as a micro-structure in the spacer material 22 with an overlying coating of specularly reflective material. The micro-structure may e.g. be provided in the spacer material 22 by etching, embossing, molding, abrasive blasting, etc. Alternatively, the micro-structure may be attached as a film or sheet onto the spacer material 22. The above-described mirror with an optical power tailored to incoming light may also be provided as a micro-structure in or on the spacer material 22.

Below follows a description of variants of the outcoupling structure in FIG. 4. Unless explicitly excluded, the bottom wall 42A and the side walls 42B may be configured according to any of the embodiments, alternatives and variants described in relation to FIGS. 10B-10C.

Figure 10D:
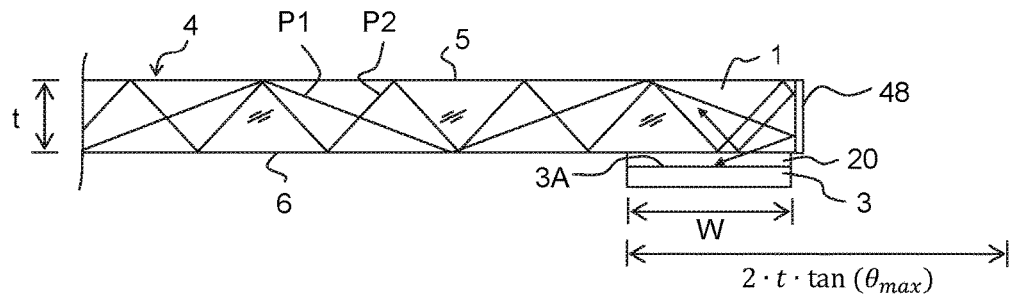
FIGS. 10D-10H are section views of variations of the first to third embodiments.

FIG. 10D illustrates an outcoupling structure that may improve the ability of the outcoupling structure to achieve a consistent detection of the propagating light within the limits $\theta_{min}$, $\theta_{max}$, when the width W of the angular filter 20 and the light-sensing surface 3A is smaller than the maximum bounce distance or even smaller than the minimum bounce distance. This is achieved by providing the edge surface, which connects the front and rear surfaces 5, 6, with a specularly reflective coating 48 at the location of angular filter 20. As shown, the coating 48 will operate to reflect, back into the panel 1, the propagating light that passes above the angular filter 20, including propagating light that strikes the filter 20 at AOIs outside the angular range $[\theta_{min}\text{-}\theta_{max}]$ and propagating light that does not strike the angular filter 20. It is realized that the coating 48 will reflect the incoming light without changing its AOIs. Thus, a portion of the reflected light will have AOIs that fall within the angular range of the filter 20. Such reflected light will be transmitted by the filter 20 to the extent that it strikes the filter 20 on its way back towards the touch surface 4. Thereby, the reflective coating 48 operates to increase the outcoupling efficiency.

It is not strictly necessary to arrange the angular filter 20 directly adjacent to the edge surface for the coating 48 to perform its function of increasing outcoupling efficiency. However, such a placement may be preferred to ensure that light on different detection lines can be reflected by the coating 48 onto the angular filter 20.

The reflective coating 48 may be generally implemented to increase outcoupling efficiency in all embodiments disclosed herein.

Figure 10E:
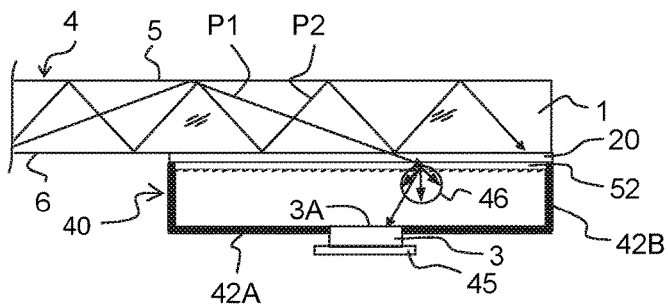

FIG. 10E illustrates a variant of the outcoupling structure in FIG. 10B. The recycler 40 is configured as a hollow case, i.e. without spacer material. This is achieved by providing the angular filter 20 with a disruptive optical element 52 on its exit surface to enable the light transmitted by the angular filter 20 to enter the hollow recycler 40. In the absence of the disruptive optical element 52, the light passing the filter 20 would have been reflected back into the filter 20 by TIR in the exit surface. In one embodiment, the element 52 is a transmissive imaging component that refracts the incoming light. The imaging component 52 thus defines an optical power that is tailored to the light passing the filter 20, e.g. to refract the light onto the light sensitive surface 3A and/or dedicated portions of the bottom and sidewalls 42A, 42B. Thereby, the walls 42A, 42B may, but need not, be specularly reflective. Such an imaging component 52 may achieve highly efficient coupling of light into the recycler 40, but may require careful positioning with respect to the filter 20 and the recycler 40. The optical power may be defined by a micro-structure that spans the surface of the imaging component 52. In one example, the micro-structure defines a sheet-like Fresnel lens.

In another embodiment, the disruptive optical element 52 is a non-imaging, diffusively transmitting component ("transmissive diffuser"). In this embodiment, the light that enters the recycler 40 is diffusive. Since light is angularly redistributed on entry, the walls 42A, 42B may, but need not, be specularly reflective. Preferably, the transmissive diffuser 52 is shift invariant to the incoming light, so that it does not have to have a specific position to the incoming light. In one example, the transmissive diffuser 52 is configured without refracting structures. Such a transmissive diffuser 52 may be implemented as a film of diffusing particles in a simple, robust and cost effective manner. The film may be applied to the filter 20 by painting, spraying, lamination, gluing, etc. Any inherently translucent material may be used for forming the film, e.g. a matte white paint or ink. However, the paint may be optimized to obtain a desired diffusive transmission ratio, e.g. by including pigments with low refractive index or spherical objects of different materials. In another example, the transmissive diffuser 52 comprises refracting structures on the side facing the away from the filter 20. In such a transmissive diffuser, also known as an engineered diffuser, the refracting structures may be implemented as an arrangement (e.g. random, pseudo-random, hexagonal, etc) of microstructures (e.g. micro-lenses, micro-cones or micro-prisms) tailored to generate a desired diffuse transmission. The engineered diffuser may be a separate flat or sheet-like device which is attached to the filter 20, or may be a surface structure on the filter 20 provided by etching, embossing, molding, abrasive blasting, etc. It is to be understood that the disruptive optical element 52 may also be implemented in the embodiment in FIG. 10A, to obviate the need for spacer material 22 between the angular filter 20 and the detector 3.

Figure 10F:
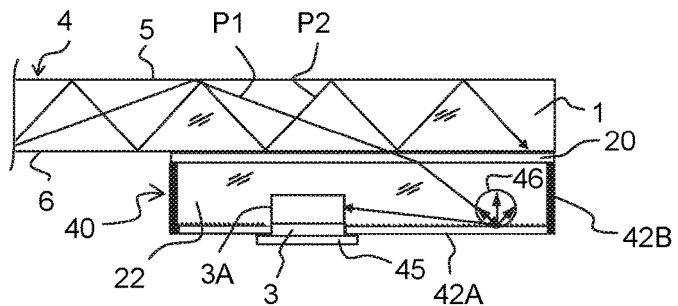

FIG. 10F illustrates a further variant of the outcoupling structure in FIG. 10B. Here, the detector 3 is side-looking when mounted on a PCB 45. The detector 3 is inserted into the spacer material 22 such that the light-sensing surface 3A projects beyond the bottom surface 42A of the recycler 40 and is perpendicular to the extent of the panel 1 and the angular filter 20. By arranging a side-looking detector 3 inside the recycler 40, it is possible to provide an increased light-sensing surface 3A for a given opening in bottom surface 42A, especially if the light-sensing surface 3A extends around the perimeter of the detector 3. The increased light-sensing surface 3A may result in an increased outcoupling efficiency. In a variant, the top surface of the detector 3 may be provided with a diffusively reflective structure to enhance the angular redistribution of light inside the recycler 40.

Figure 10G:
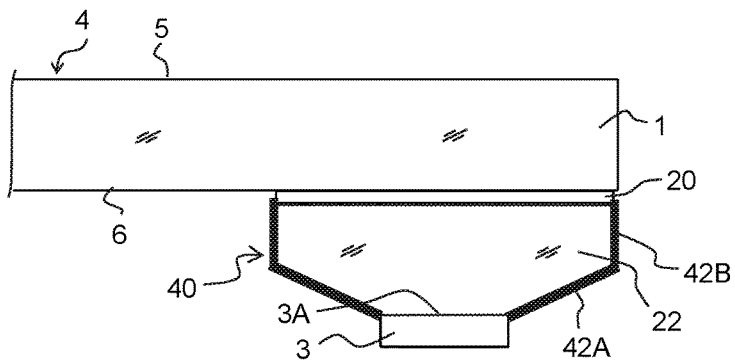

FIG. 10G illustrates a further variant of the outcoupling structure in FIG. 10B, in which the recycler 40 is configured as a funnel tailored to direct the light transmitted by the filter 20 onto the light-sensing surface 3A. The funnel is defined by the walls 42A, 42B, which are specularly reflective. It should be noted that the recycler 40 may have other shapes than shown in FIG. 10G. For example, the bottom wall 42A may be parabolic. Other suitable shapes may be obtained by optical system optimization, such as by ray tracing. Furthermore, the walls 42A, 42B may be merged into a common funnel structure, which may be parabolic or have any optimized shape. The recycler 40, and optionally the filter 20, may be integrated with the detector 3 into a package, which is attached to the rear surface 6 during manufacture of the apparatus.

Figure 10H:
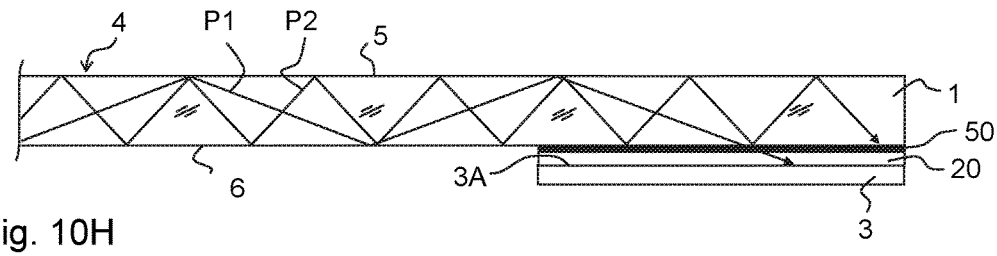

FIG. 10H illustrates a variant of the outcoupling structure in FIG. 4. In FIG. 10H, the apparatus 100 further comprises a visibility filter 50, which is arranged to hide (shield) the angular filter 20, the detector 3 and the internal structure of the apparatus 100 from view through the front surface 5. The visibility filter 50 is non-transmissive (reflecting and/or absorbing) to visible light and transmissive to NIR light, and preferably only transmissive to NIR light in the wavelength region of the propagating light. The visibility filter 50 may be implemented as a coating or film, in one or more layers. In FIG. 10H, the visibility filter 50 extends from the inner edge of the angular filter 20 to the edge of the panel 1, although the visibility filter 50 may extend further beyond the angular filter 20 towards the center of the panel. In FIG. 10H, the visibility filter 50 is arranged beneath the panel 1, intermediate the rear surface 6 and the angular filter 20. This enables the front surface 5 to be perfectly flat and free of projecting elements. In a variation, not shown, the visibility filter 50 is arranged intermediate the angular filter 20 and the detector 3. In a further variation, not shown, the visibility filter 50 is applied to the front surface 5. It is to be understood that the visibility filter 50 may be implemented in conjunction with any outcoupling structure described herein.

There are other ways of integrating the angular filter in the outcoupling structure than by arranging the above-described multilayer structure in front of the detector 3. For example, the angular filter may be formed by a structure that geometrically and mechanically limits the light rays that can reach the detector, as exemplified below with reference to FIGS. 11-12.

Figure 11A:
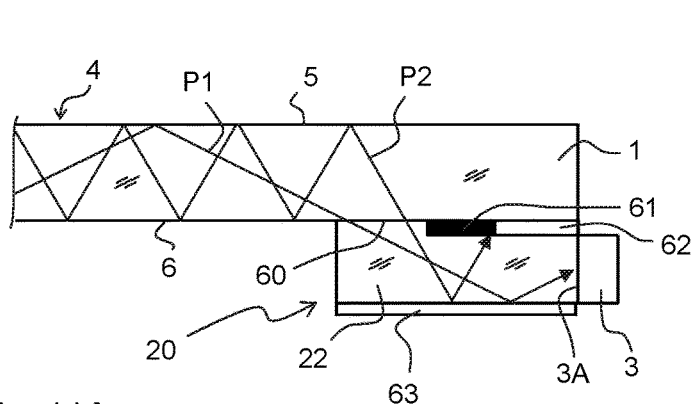
FIGS. 11A-11B are section and plan views of a first alternative outcoupling structure.
Figure 11B:
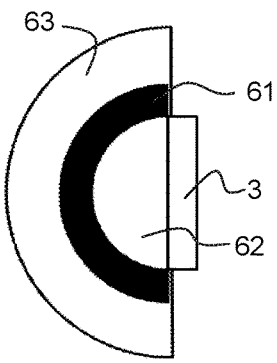

FIG. 11A is a side view of a first alternative outcoupling structure as attached to the panel 1, and FIG. 11B is a top plan view of the outcoupling structure. The outcoupling structure forms an angular filter 20 by defining an angularly limited propagation path from an outcoupling port 60 to the light-sensitive surface 3A. The angular filter 20 is defined by non-transmissive layers 61-63 on a body of light transmissive material 22, e.g. any of the spacer materials discussed in relation to FIG. 10A. Layers 61 and 62 are arranged on top of the body, to define the outcoupling port 60 at the interface between the body and the panel 1. Layer 61 is light-absorbing and formed as an annulus segment. Layer 61 only needs to be absorbing to light inside the body. Layer 62 is specularly reflective and formed as a semi-circle, which may extend to the inner radius of the annulus segment, as shown, or to the outer radius of the annulus segment (i.e. between layer 61 and the panel 1). The top of the body is attached to the rear surface 6 of the panel 1, and the light detector 3 is attached to a short-side of the body such that the surface 3A is shielded beneath the layers 61, 62. Layer 63 is specularly reflective and attached to bottom side of the body.

FIG. 11A illustrates one propagating ray P1 that passes the outcoupling port 60 at an AOI within the angular range of the filter 20 and is reflected by layer 63 onto surface 3A. FIG. 11A also illustrates a propagating ray P2 that propagates in the panel 1 by TIR and passes the outcoupling port 60 and is reflected by layer 63 onto layer 61 which absorbs the ray. As seen, the structure of layers 61-63 define the angular range of the filter 20. The width of the layer 61 along the respective detection line defines $\theta_{min}$, for a given vertical height of the body. To achieve similar $\theta_{min}$ for all detection lines in the plane of the panel, layer 61 is shaped as an annulus segment, although more complicated shapes are conceivable to achieve a corresponding effect.

Figure 12A:
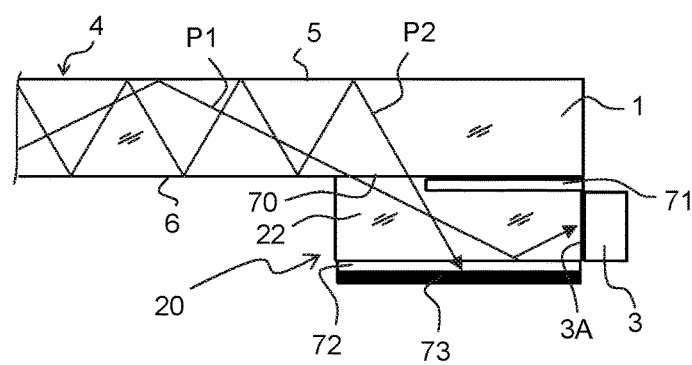
FIGS. 12A-12B are section and plan views of a second alternative outcoupling structure.
Figure 12B:
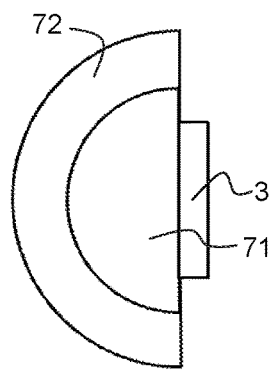

FIG. 12A is a side view of a second alternative outcoupling structure as attached to the panel 1, and FIG. 12B is a top plan view of the outcoupling structure. Like the first variant in FIG. 11, the outcoupling structure forms an angular filter 20 by layers 71-73 attached to a body of light transmissive material which is attached to the rear surface 6 of the panel 1. Layer 71 is arranged on top of the body, to define an outcoupling port 70 at the interface between the body and the panel 1. Layer 71 is specularly reflective and, in this example, formed as a semi-circle. Layer 72 is light-transmissive and attached to the bottom surface of the body, and has a refractive index that causes light that impinges on the outcoupling port 70 at AOIs above $\theta_{min}$ to be reflected by TIR at the interface between the body and layer 72, whereas light at smaller AOIs is transmitted into layer 72 and is absorbed by layer 73 of light-absorbing material. It is realized that the refractive index of layer 72 is given by $n_{72}=n_{panel}\cdot\sin(\theta_{min})$. The function of the outcoupling structure exemplified by one ray P1 that passes the filter 20 and one ray P2 that is coupled into layer 72.

In both of the first and second variants, it is conceivable that the refractive index $n_{spacer}$ of the body is selected to yield a desired $\theta_{max}$ by TIR in the interface between the body and the panel: $n_{spacer}=n_{panel}\cdot\sin(\theta_{max})$.

Figure 13A:
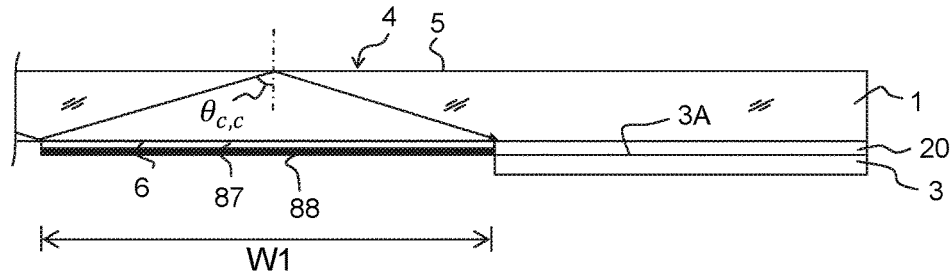
FIGS. 13A-13B are section views of outcoupling structures combined with a layered light absorber.
Figure 13B:
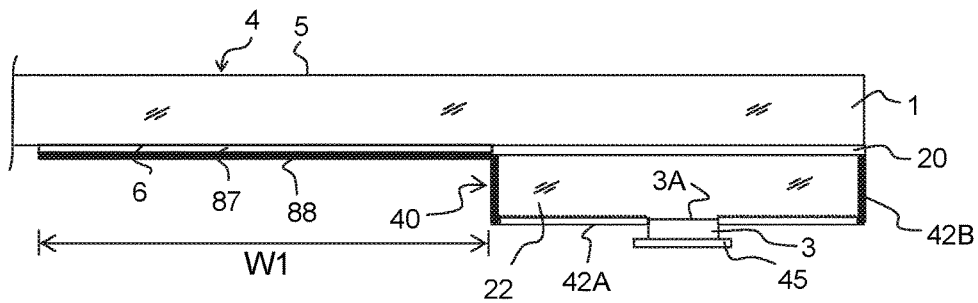

FIG. 13A illustrates a variant of the embodiment in FIG. 4, in which an assembly of layers 87, 88 (denoted "layered absorber" in the following) is attached to the rear surface 6 adjacent to the outcoupling structure. Layer 87 is light-transmissive and attached to the rear surface 6, and layer 88 is light-absorbing and attached to layer 87. Layers 87, 88 may be configured in correspondence with the coupling layer 37 and the light-absorbing layer 38, respectively, as described above with reference to FIG. 9B. Thereby, the layered absorber will absorb all light that impinges thereon with an AOI below $\theta_{c,c}=\arcsin(n_{coupl}/n_{panel})$, where $n_{coupl}$ is the index of refraction of the coupling layer 87. It is realized that the layered absorber may combine with the angular filter 20 to limit the angles of the light that reaches the detector 3. The layered absorber may be configured with a width $W1 \geq 2\cdot t\cdot\tan(\theta_{c,c})$, in the direction of the respective detection line, to ensure that the propagating light with AOIs below $\theta_{c,c}$ strikes the coupling layer 87 at least once. The provision of the layered absorber may relax the requirements of the angular filter 20, and it may even be possible to omit the angular filter 20, in this and all other outcoupling structures described herein, since the layered absorber effectively forms an angular filter to the light that propagates in the panel 1 towards the outcoupling structure. The limit angle $\theta_{c,c}$ may be selected to reduce the impact of ambient light and contamination as described above for the assembly of layers 37, 38 (FIG. 9B). The layered absorber may be combined with all outcoupling structures described herein. As a further example, FIG. 13B illustrates such a combination with the outcoupling structure in FIG. 10B which includes a recycler 40.

Figures 17A, 17B:
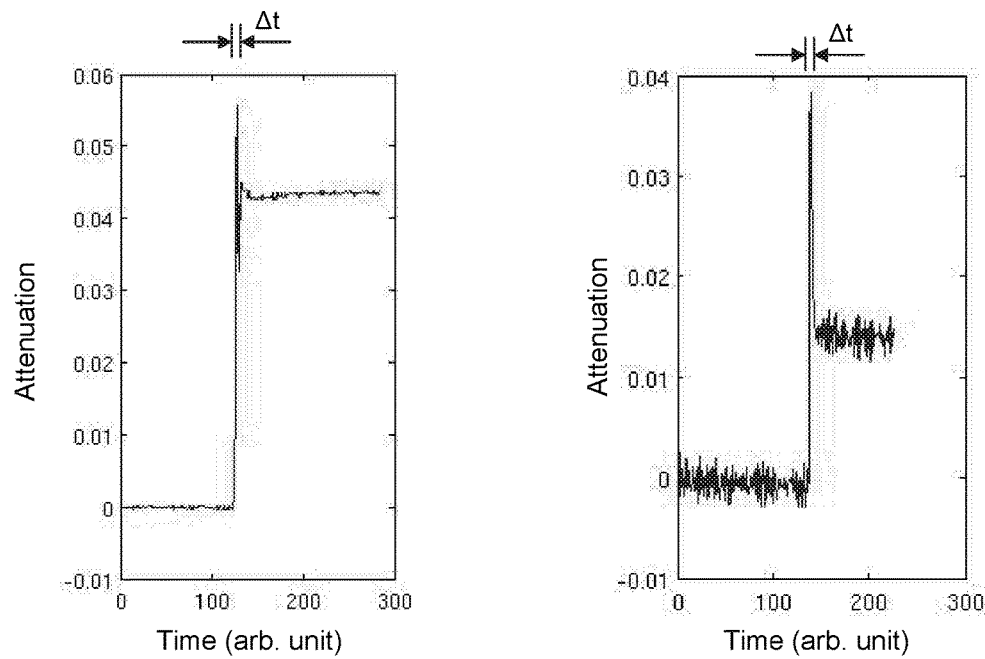
FIGS. 17A-17B are graphs of signal attenuation measured before, during and after a finger tap without and with the layered light absorber on the panel in FIG. 9B.

The sensitivity to contamination may be reduced by increasing the width W1 of the layered absorber. In one extreme, the assembly of layers 87, 88 spans the entire rear surface 6 from the outcoupling structure to the incoupling structure. At this extreme, the layered absorber is identical to the assembly of layers 37, 38 in FIG. 9B. The reason for the improvement with increasing width W1 is believed to be that the propagating light that reaches the detector 3 is less affected by light scattering in surface contamination. As mentioned in relation to FIG. 9B, light that propagates in the panel 1 is scattered when it hits surface contamination, and part of the scattered light will propagate in the panel 1 and possibly be further scattered against surface contamination, and so on. This means that the intensity distribution as a function of AOI for the light that reaches the filter 20, and the amount of light received by the detector 3, will depend on the current distribution of contamination on the touch surface 4. This may, e.g., make it difficult to detect a finger tap on the touch surface 4, since the finger tap leaves a fingerprint which may cause a signal change at the detector 3 that at least partly masks the signal change caused by the finger being lifted from the touch surface. A larger width W1 of the layered absorber will reduce the intensity redistribution caused by light scattering in surface contamination. This effect is seen in FIGS. 17A-17B, which illustrate time-resolved signal attenuation measured for a detection line on a touch surface heavily contaminated by sebum, while a short finger tap (touch-down followed by touch-up) occurs within the time window Δt. FIG. 17A shows the result for a panel without a layered absorber, and FIG. 17B shows the result with a layered absorber ($\theta_{c,c}=70°$) that spans the entire rear surface between the incoupling and outcoupling structures (cf. FIG. 9B). Signal attenuation is defined as I/I0, where I is the measured intensity at the detector 3, and I0 is the measured intensity without a finger on the detection line. As seen, the measured attenuation rises to a peak at touch-down and then returns to an elevated level at touch-up. The elevated level is caused by the fingerprint left by the finger tap on the touch surface. However, the difference in attenuation between touch-down and touch-up is increased by a factor of 2 in FIG. 17B compared to FIG. 17A. It is understood that the layered absorber may improve the ability to detect a touch-up event during a finger tap.

3. Incoupling Structure

Generally, any type of incoupling structure may be used for coupling light into the panel 1 of the touch-sensitive apparatus. In certain implementations, it may be advantageous for the incoupling structure to include an angular filter similar to the one in the above-described outcoupling structures. A few embodiments of such light incoupling structures will be explained in detail with reference to FIG. 14. Generally, these embodiments are presented in the context of the touch-sensitive apparatus shown in FIG. 2.

Figure 14A:
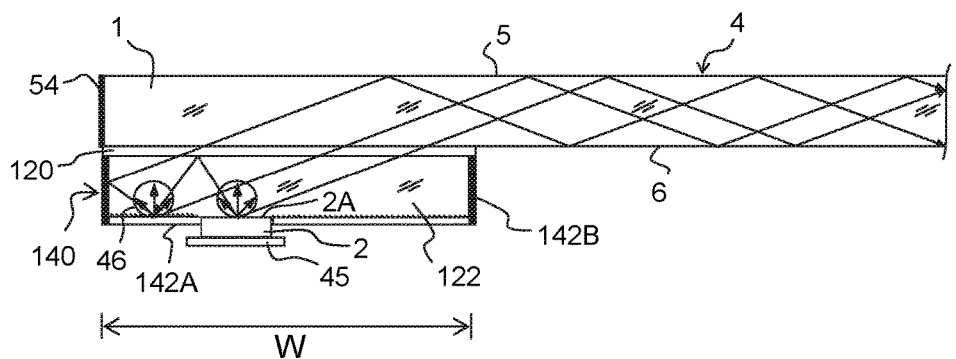
FIGS. 14A-14B are section and plan views of a light incoupling structure according to a first embodiment.

FIG. 14A illustrates a section that may be taken along any one of the detection lines D of the touch-sensitive apparatus in FIG. 2. For simplicity, only a portion of the apparatus at and around the incoupling structure is shown. The incoupling structure includes a sheet-like angular filter 120 which is applied with its front face to the rear surface 6 of the panel 1 to define an incoupling port at the periphery of the touch surface 4. In the illustrated example, the angular filter 120 is implemented as a multilayer structure, which may be similar to, or even identical to, the angular filter 20 described above in relation to FIGS. 4-5. A recycler 140 is arranged beneath the angular filter 120 in surrounding relationship to a light-emitting surface 2A of an emitter 2. The recycler 140 defines a reflective enclosure around the light-emitting surface 2A. The enclosure is filled by a spacer material 122, e.g. any of the spacer materials discussed in relation to FIG. 10A. The recycler 140 comprises a reflective bottom surface 142A with an opening for the emitter 2 (illustrated as mounted on a PCB 45) and reflective sidewalls 142B that extend from the bottom surface 142A to the filter 120.

The angular filter 120 is configured to only be transmissive to light from within the recycler 140 within a given angular range [$\theta'_{min}$-$\theta'_{max}$] with respect to the normal of the filter 120. Light at other angles of incidence is reflected, specularly or diffusively, back into the recycler 140.

In the embodiment of FIG. 14A, the bottom surface 142A is diffusively reflective to impinging light, whereas the sidewalls 142B are specularly reflective to impinging light. The function of the incoupling structure is exemplified for a few rays originating from the light-emitting surface 2A. As shown, light is emitted from the surface 2A in a divergent beam of light. Some light is emitted onto the filter 120 at angles that are directly transmitted into the panel 1 (one ray shown), whereas other light is reflected against the filter 120 back towards the bottom surface 142A (one ray shown), where it is diffusively reflected, as indicated by the encircled rays 46. Some of this diffusively emitted light is transmitted into the panel 1 by the filter 120, either directly or after reflection in the side wall 142B. The rest of the diffusively reflected light will be recirculated by further reflections inside the recycler 140. Thus, the recycler 140 operates to gradually concentrate the light from the emitter 2 into the angular range [$\theta'_{min}$-$\theta'_{max}$] by multiple reflections inside the recycler 140. Due to the speed of light, this process is instant compared to the time scale used by the signal processor 10 for sampling data from the detectors 3. In a variation, both the bottom wall 142A and the side walls 142B are diffusively reflective. In another alternative, the side walls 142B are diffusively reflective, while the bottom surface 142A is specularly reflective. In all embodiments, it is possible that only a part of the bottom wall 142A and/or the side walls 142B is diffusively reflective.

The use of an angular filter 120 provides a simple, efficient and robust technique for providing light within a well-defined angular range [$\theta'_{min}$-$\theta'_{max}$] inside the panel 1.

It should be noted, that the width W of the incoupling structure may be set to be less than the minimum bounce distance for the in-coupled light, which is given by $2 \cdot t \cdot \tan(\theta'_{min})$ if the panel 1 consists of a single material. This ensures that light transmitted by the angular filter 120 and impinging on the front surface 5 at $\theta'_{min}$, or there above, will not be reflected back onto the angular filter 120.

The incoupling structure of FIG. 14A is configured to introduce light into the panel 1 within an angular range [$\theta'_{min}$-$\theta'_{max}$] that at least approximately matches the angular range [$\theta_{min}$-$\theta_{max}$] of the angular filter 20 in the outcoupling structure. The (approximate) matching of the angular ranges between the incoupling and outcoupling structures will ensure efficient utilization of the available light energy, and it may also reduce the impact of surface contamination, by analogy with the discussion above with reference to FIG. 9B. The matching may be inherently achieved by installing identical angular filters 20, 120 in the incoupling and outcoupling structures.

Figure 14B:
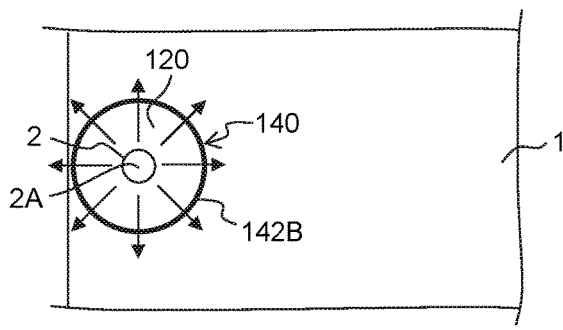

As shown in the plan view of FIG. 14B, the combination of angular filter 120 and recycler 140 will couple light into the panel for propagation in all directions in the plane of the panel 1, provided that the incoming light impinges on the angular filter 120 with AOIs within the angular range [$\theta'_{min}$-$\theta'_{max}$]. Thus, the incoupling structure in FIG. 14B can define the starting point of detection lines to different detectors 3 (cf. FIG. 2). In the example of FIG. 14B, the recycler 140 is circular in plan view, but other shapes are possible, e.g. elliptical or polygonal.

Figure 14C:
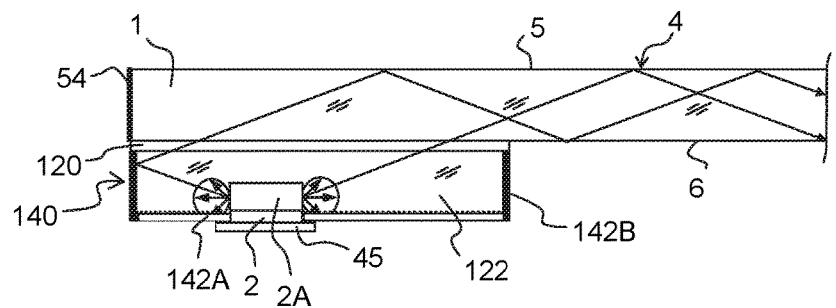
FIGS. 14C-14D are section views of variations of the first embodiment.

FIG. 14C illustrates a variant of the incoupling structure in FIG. 14A. Here, the emitter 2 is side-emitting when mounted on a PCB 45. The emitter 2 is inserted into the spacing material 122 such that the light-emitting surface 2A projects beyond the bottom surface 142A of the recycler 140 and is perpendicular to the extent of the panel 1 and the angular filter 120. By arranging a side-emitting emitter 2 inside the recycler 40, it is possible to increase the light-emitting surface 2A for a given opening in bottom surface 142A. Furthermore, the top surface of the emitter 2 may be provided with a diffusively reflective surface, to enhance the angular redistribution in the recycler 140. Also, the angular redistribution may be improved since the light from the emitter 2 is at least partly directed towards the bottom wall 142A and the side walls 142B, instead of directly against the angular filter 120 as in FIG. 14A.

Figure 14D:
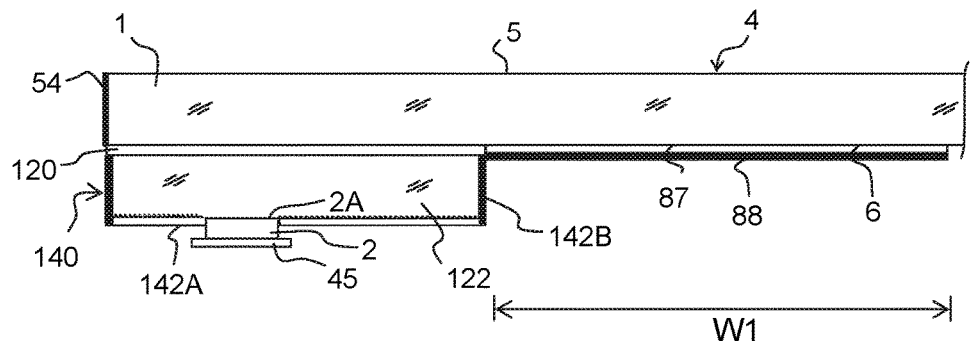

FIG. 14D illustrates a variant of the embodiment in FIG. 14A, in which the above-mentioned layered absorber, consisting of layers 87, 88, is attached to the rear surface 6 adjacent to the incoupling structure. For the same reason as in FIGS. 13A-13B, the layered absorber preferably has a width $W1 \geq 2 \cdot t \cdot \tan(\theta_{c,c})$, and as explained above the effects of the layered absorber may increase with increasing width W1. The layered absorber may be combined with all conceivable incoupling structures. The use of the layered absorber may enable the angular filter 20 to be omitted altogether, in this and all other incoupling structures described herein.

It should also be noted that the above-described visibility filter (cf. 50 in FIG. 10H) may be implemented in conjunction with any incoupling structure described herein, e.g. intermediate the rear surface 6 and the angular filter 120.

Figures 15A, 15B:
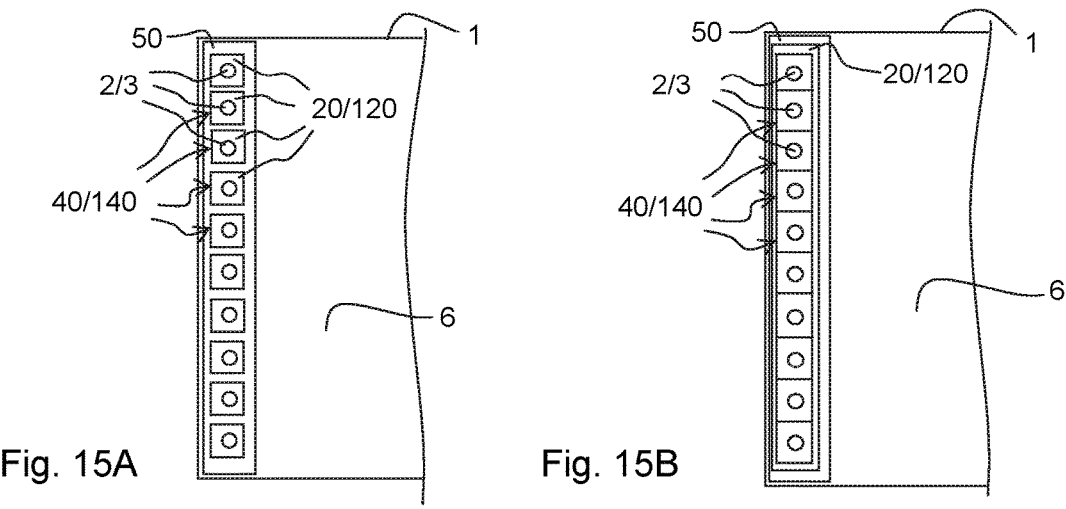
FIGS. 15A-15B are bottom plan views of a sequence of structures arranged on a panel to couple light into and/or out of the panel.

FIG. 15A is a bottom plan view of a part of a touch-sensitive apparatus, to illustrate a sequence of emitters 2 and/or detectors 3 that are optically coupled to a panel 1 near one of the panel edges, via a visibility filter 50 which is applied to the rear surface 6 to extend as a coherent, elongate strip along the panel edge. Each emitter 2 and detector 3 is coupled to the panel 1 by a coupling structure, which is formed by an angular filter 20/120 and a recycler 40, 140. The combination of angular filters 20/120 and recyclers 40/140 are arranged as discrete units along the panel edge. FIG. 15B illustrates an alternative implementation, where the angular filter 20/120 is applied onto the visibility filter 50 to extend as a coherent, elongate strip along the panel edge. Thus, the same angular filter 20/120 is used for coupling all emitters 2 and/or detectors 3 to the panel 1 along the panel edge. The recyclers 40/140 may be arranged side-by-side onto the angular filter 120, as shown, or they may be arranged with a mutual spacing, similar to FIG. 15A.

The coupling structures in FIGS. 15A-15B may be applied to the panel 1 in a sequence of operations, which include applying the visibility layer 50 on the panel 1, applying the angular filters 20/120 onto the visibility layer 50, and applying prefabricated recyclers 40/140 onto the angular filters 20/120. Alternatively, the angular filters 20/120 and the recyclers 40/140 may be provided as a single prefabricated strip which is attached onto the visibility layer 50 on the panel 1 (if present). In another alternative, the recyclers 40/140 are produced by a sequence of processing steps in situ on the panel, including e.g. attaching the spacer material 22/122 to the angular filter 20/120, applying a dedicated coating to the side walls 42B/142B while masking the bottom wall 42A/142A, applying a dedicated coating to the bottom walls 42A/142A while masking the openings for the detectors/emitters 2, 3, and attaching the detector/emitters 2, 3 to the openings.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, while technical advantages may be obtained by utilizing angular filters, in particular multilayer structures, for both outcoupling and incoupling, it is conceivable to combine the inventive outcoupling structures that utilize angular filters with conventional incoupling structures, e.g. large prisms or sheet-like microstructures as discussed in the Background section, by direct attachment to the front or rear surface, or by optical coupling via the edge surface.

In certain installations, one or both of the incoupling and outcoupling structures may be arranged on the front surface 5 instead of the rear surface 6.

The foregoing description indicates that certain selections of the lower limit $\theta_{min}$ (e.g. with respect to the cutoff angles $\theta_{c,l}$, $\theta_{c,c}$, $\theta_w$, $\theta_f$) results in significant performance improvement. However, it is possible that performance improves gradually as the lower limit $\theta_{min}$ is increased from the critical angle $\theta_c$, e.g. in steps 1°, at least in certain installations. Testing of a certain installation may thus indicate that an acceptable performance improvement is attained at another selected $\theta_{min}$, e.g. any angle between $\theta_c$ and $\theta_w$, between $\theta_w$ and $\theta_f$, and between $\theta_f$ and $\theta_{sc}$. The same applies to the selection of refractive index of the lamination layer/coupling layer for suppressing the influence of contamination via the cutoff angle $\theta_{c,l}/\theta_{c,c}$.

The invention claimed is:

1. A touch-sensitive apparatus, comprising:
   a light transmissive panel that defines a front surface and an opposite, rear surface;
   a plurality of light emitters optically connected to the light transmissive panel, the plurality of light emitters configured to generate propagating light that propagates by total internal reflection inside the light transmissive panel across a touch-sensitive region of the light transmissive panel;
   a plurality of light detectors optically connected to the light transmissive panel so as to define a grid of propagation paths across the touch-sensitive region between pairs of light emitters and light detectors;
   an outcoupling angular filter on an outcoupling region of at least one of the front surface and the rear surface;
   wherein the outcoupling angular filter is configured to optically couple a portion of the propagating light impinging on the at least one of the front surface and the rear surface out of the light transmissive panel and toward at least one of the plurality of light detectors;
   wherein the portion of the propagating light includes propagating light only within a confined range of angles with respect to a normal of the outcoupling region;
   wherein the confined range of angles extends from a lower angle limit $\theta_{min}$ to an upper angle limit $\theta_{max}$;
   wherein the lower angle limit $\theta_{min}$ is equal to or larger than a critical angle $\theta_c$, which is given by $\theta_c = \arcsin(1/n_{panel})$, with $n_{panel}$ being a refractive index of the light transmissive panel at the outcoupling region; and
   wherein the lower angle limit $\theta_{min}$ is equal to or larger than a cut-off angle $\theta_w = \arcsin(n_w/n_{panel})$, with $n_w$ being the refractive index of water, and $n_{panel} > n_w$.

2. The touch-sensitive apparatus of claim 1, wherein the light transmissive panel is mounted to a front surface of a display device by a lamination layer of light transmissive material, which is arranged in contact with the rear surface of the light transmissive panel and the front surface of the display device.

3. The touch-sensitive apparatus of claim 1, wherein the outcoupling angular filter is configured to define substantially the same confined range of angles for all detection lines that extend to a respective light detector.

4. The touch-sensitive apparatus of claim 1, wherein the outcoupling angular filter is configured as a dielectric multilayer structure.

5. The touch-sensitive apparatus of claim 4, further comprising:
   a light recycler arranged beneath the outcoupling angular filter to define a light reflective enclosure with respect to the outcoupling angular filter and a light-sensitive surface of a respective light detector.

6. The touch-sensitive apparatus of claim 5, wherein the light reflective enclosure comprises:
   a light reflective bottom surface that is spaced apart from, and extends parallel to, the outcoupling angular filter; and
   a reflective side wall structure that extends between the light reflective bottom surface and the outcoupling angular filter.

7. The touch-sensitive apparatus of claim 5, wherein the light reflective enclosure is hollow,
   a disruptive structure is on the outcoupling angular filter so as to face the light reflective enclosure, and
   the disruptive structure is configured to transmit and redirect at least part of the portion of the propagating light.

8. The touch-sensitive apparatus of claim 7, wherein the disruptive structure is an imaging structure configured to refract the light transmitted by the outcoupling angular filter.

9. The touch-sensitive apparatus of claim 5, wherein the respective light detector is arranged with the light-sensitive surface facing the outcoupling angular filter.

10. The touch-sensitive apparatus of claim 1, wherein
    a body of light-transmissive material is attached to the outcoupling angular filter, and
    a respective light detector is attached to the body of light-transmissive material such that a light-sensitive surface of the respective light detector directly receives the portion of the propagating light from the outcoupling angular filter.

11. The touch-sensitive apparatus of claim 1, wherein
    the outcoupling angular filter is further configured to direct at least part of the portion of the propagating light toward a respective light detector within a respective outcoupling port on the rear surface, and
    an extent of the respective outcoupling port, along detection lines that extend to the respective light detector, is at least equal to a distance between consecutive reflections at the rear surface for propagating light that impinges on the outcoupling angular filter with an angle of incidence of $\theta_{min}$ to a normal of the outcoupling angular filter.

12. The touch-sensitive apparatus of claim 1, wherein
    the propagating light includes light in an infrared wavelength region, and
    the touch-sensitive apparatus further includes a visibility shield arranged between the rear surface and the outcoupling angular filter, the visibility shield configured to block light that is visible to a human eye and to transmit at least part of said light in the infrared wavelength region.

13. The touch-sensitive apparatus of claim 1, wherein each of the plurality of light emitters is optically connected to the light transmissive panel via an incoupling angular filter on an incoupling region of at least one of the front surface and the rear surface, the incoupling angular filter configured to optically couple light from a respective light emitter only within a confined range of angles into the light transmissive panel, and the confined range of angles of the incoupling angular filter on the incoupling region is matched to the confined range of angles of the outcoupling angular filter on the outcoupling region.

14. The touch-sensitive apparatus of claim 13, wherein the incoupling angular filter on the incoupling region is identical to the outcoupling angular filter on the outcoupling region.

15. A touch-sensitive apparatus, comprising:

a light transmissive panel that defines a front surface and an opposite, rear surface;

a plurality of light emitters optically connected to the light transmissive panel, the plurality of light emitters configured to generate propagating light that propagates by total internal reflection inside the light transmissive panel across a touch-sensitive region of the light transmissive panel;

a plurality of light detectors optically connected to the light transmissive panel so as to define a grid of propagation paths across the touch-sensitive region between pairs of light emitters and light detectors;

an outcoupling angular filter on an outcoupling region of at least one of the front surface and the rear surface;

wherein the outcoupling angular filter is configured to optically couple a portion of the propagating light impinging on the at least one of the front surface and the rear surface out of the light transmissive panel and toward at least one of the plurality of light detectors;

wherein the portion of the propagating light includes propagating light only within a confined range of angles with respect to a normal of the outcoupling region;

wherein the confined range of angles extends from a lower angle limit $\theta_{min}$ to an upper angle limit $\theta_{max}$;

wherein the lower angle limit $\theta_{min}$ is equal to or larger than a critical angle $\theta_c$, which is given by $\theta_c=\arcsin(1/n_{panel})$, with $n_{panel}$ being a refractive index of the light transmissive panel at the outcoupling region; and wherein the lower angle limit $\theta_{min}$ is equal to or larger than a cut-off angle $\theta_f=\arcsin(n_f/n_{panel})$, with $n_f$ being the refractive index of finger fat, and $n_{panel}>n_f$.

* * * * *